US012560253B2

(12) United States Patent
Bommineni et al.

(10) Patent No.: US 12,560,253 B2
(45) Date of Patent: Feb. 24, 2026

(54) VENT ASSEMBLY

(71) Applicant: Donaldson Company, Inc., Bloomington, MN (US)

(72) Inventors: Suresh B. Bommineni, Shakopee, MN (US); Matthew J. Goode, Blaine, MN (US); Shane B. Campbell, Salt Lake City, UT (US); James P. Moorman, Eden Prairie, MN (US); Jacob L. Sanders, Apple Valley, MN (US); Scott A. Betcher, Lakeville, MN (US); Daniel L. Tuma, St. Paul, MN (US); Lisa R. Bronson, Burnsville, MN (US); Daniel J. Dotzler, Webster, MN (US)

(73) Assignee: Donaldson Company, Inc., Bloomington, MN (US)

( * ) Notice: Subject to any disclaimer, the term of this patent is extended or adjusted under 35 U.S.C. 154(b) by 255 days.

(21) Appl. No.: 18/095,882

(22) Filed: Jan. 11, 2023

(65) Prior Publication Data

US 2023/0235829 A1 Jul. 27, 2023

Related U.S. Application Data

(60) Provisional application No. 63/298,553, filed on Jan. 11, 2022.

(51) Int. Cl.
*F16K 17/19* (2006.01)
*F16K 17/40* (2006.01)
(Continued)

(52) U.S. Cl.
CPC ............ *F16K 17/19* (2013.01); *F16K 17/403* (2013.01); *F16K 27/0236* (2013.01); *F16K 27/12* (2013.01); *H01M 50/3425* (2021.01)

(58) Field of Classification Search
CPC .... F16K 17/19; F16K 17/403; F16K 27/0236; F16K 27/12; H01M 50/3425;
(Continued)

(56) References Cited

U.S. PATENT DOCUMENTS 3,201,284 A    8/1965   Ellis
3,913,601 A   *   10/1975   Hanson ................... F16K 17/36
     137/39
(Continued)

FOREIGN PATENT DOCUMENTS

AU      2010100984 A4    3/2011
BE      1009834 A6    10/1997
(Continued)

OTHER PUBLICATIONS

DIAvent, "DIAvent—the Versatile Pressure Equalization Element for Lithium-Ion Batteries," Technologies, accessed Jan. 5, 2024 https://www.fst.com/press/2017/freudenberg-diavent-press, 6 pages.
(Continued)

*Primary Examiner* — Craig M Schneider
*Assistant Examiner* — Andrew J Rost
(74) *Attorney, Agent, or Firm* — Mueting Raasch Group

(57) ABSTRACT

The present disclosure is generally related to vent assemblies. More particularly, the present disclosure is related to vent assemblies that are configured for pressure equalization of an enclosure.

8 Claims, 12 Drawing Sheets

(51) Int. Cl.
    *F16K 27/02*     (2006.01)
    *F16K 27/12*     (2006.01)
    *H01M 50/342*     (2021.01)

(58) Field of Classification Search
    CPC ......... Y10T 137/7771; Y10T 137/7779; Y10T
                 137/7832; Y10T 137/7838; Y10T
                                137/7879
    USPC ...................... 137/512, 506, 843, 493, 493.8
    See application file for complete search history.

(56) References Cited

U.S. PATENT DOCUMENTS

| | | | | |
|---|---|---|---|---|
| 4,337,873 A * | 7/1982 | Johnson | ............. | B60K 15/0406 |
| | | | | 220/203.02 |
| 4,352,365 A * | 10/1982 | Boccardo | ................ | F16K 17/16 |
| | | | | 220/89.2 |
| 4,962,548 A | 10/1990 | van Deventer et al. | | |
| 5,419,366 A | 5/1995 | Johnston | | |
| 5,499,654 A * | 3/1996 | Shefte | ..................... | F16K 17/19 |
| | | | | 220/203.16 |
| 5,697,770 A | 12/1997 | Schulz | | |
| 5,752,746 A | 5/1998 | Perry | | |
| 5,860,708 A | 1/1999 | Borders et al. | | |
| 6,058,966 A | 5/2000 | Schutz | | |
| 6,294,282 B1 | 9/2001 | Misra et al. | | |
| 6,334,761 B1 * | 1/2002 | Tai | ..................... | F16K 99/0046 |
| | | | | 137/859 |
| 6,562,517 B1 | 5/2003 | Misra et al. | | |
| 7,572,544 B2 | 8/2009 | Kozuki et al. | | |
| 8,069,875 B2 | 12/2011 | Mashiko | | |
| 8,105,408 B2 | 1/2012 | Thomas et al. | | |
| 8,674,260 B2 | 3/2014 | Modena et al. | | |
| 8,802,254 B2 | 8/2014 | Lee | | |
| 8,807,154 B2 | 8/2014 | Khamitkar | | |
| 9,935,301 B2 | 4/2018 | Gless et al. | | |
| 10,164,227 B2 | 12/2018 | Hofer | | |
| 10,228,068 B2 | 3/2019 | Goggin et al. | | |
| 10,439,185 B2 | 10/2019 | Fukuoka et al. | | |
| 10,539,246 B2 | 1/2020 | Pflueger et al. | | |
| 10,557,561 B2 | 2/2020 | Kleinke et al. | | |
| 2002/0096214 A1 | 7/2002 | Bauer | | |
| 2003/0002995 A1 | 1/2003 | Urano et al. | | |
| 2006/0140782 A1 | 6/2006 | Weber | | |
| 2007/0125231 A1 | 6/2007 | Thomas et al. | | |
| 2010/0170573 A1 | 7/2010 | Draper et al. | | |
| 2012/0312161 A1 | 12/2012 | Reitzle et al. | | |
| 2014/0079964 A1 | 3/2014 | Gless et al. | | |
| 2019/0093776 A1 * | 3/2019 | Ligeti | ..................... | F16K 17/16 |
| 2021/0379535 A1 | 12/2021 | Pillarella et al. | | |
| 2021/0396323 A1 | 12/2021 | Nakayama et al. | | |

FOREIGN PATENT DOCUMENTS

| | | |
|---|---|---|
| CN | 101706342 B | 2/2012 |
| CN | 104455616 B | 2/2019 |
| DE | 2028383 A1 | 3/1972 |
| DE | 4108491 A1 | 9/1992 |
| DE | 4446170 A1 | 6/1996 |
| DE | 10103275 A1 | 8/2002 |
| DE | 20315524 U1 | 1/2004 |
| DE | 10242110 A1 | 3/2004 |
| DE | 102005029730 A1 | 2/2007 |
| DE | 102006053114 A1 | 5/2008 |
| DE | 102009054921 A1 | 6/2011 |
| DE | 102010028861 A1 | 11/2011 |
| DE | 102011005916 A1 | 9/2012 |
| DE | 102012202103 A1 | 8/2013 |
| DE | 102011015925 B4 | 4/2014 |
| DE | 102013213909 A1 | 1/2015 |
| DE | 102020204436 A1 | 10/2021 |
| EP | 504573 A1 | 9/1992 |
| EP | 922649 A1 | 6/1999 |
| EP | 2031248 A2 | 3/2009 |
| EP | 1625373 B1 | 10/2010 |
| EP | 2410592 B1 | 4/2016 |
| EP | 2815637 B1 | 4/2018 |
| GB | 1302631 A | 1/1973 |
| GB | 2177016 A | 1/1987 |
| GB | 2209583 A | 5/1989 |
| GB | 2401330 A | 11/2004 |
| JP | S59134369 U | 9/1984 |
| JP | 4917427 B2 | 4/2012 |
| KR | 101121765 B1 | 3/2012 |
| WO | 2008004862 A1 | 1/2008 |
| WO | 2020085210 A1 | 4/2020 |
| WO | 2021204562 A1 | 10/2021 |

OTHER PUBLICATIONS

Furness, "Gore's new battery pack evacuation vent combines a flexible membrane and waterproof design," EV Engineering News, May 19, 2016, https://chargedevs.com/newswire/gores-new-battery-pack-evacuation-vent-combines-a-flexible-membrane-and-waterproof-design/, 16 pages.

International Search Report and Written Opinion in PCT/US2023/010610, mailed Jun. 26, 2023, 16 pages.

Invitation to Pay Additional Fees in PCT/US2023/010610, mailed May 3, 2023, 12 pages.

McMaster-Carr, "Compact Pressure Release Valves," May 5, 2021, https://www.mcmaster.com/pressure-relief-valves/compact-pressure-relief-valves/, 2 pages.

Minivalve, "Minivalve Original Valve Components," accessed Jan. 5, 2024, http://www.minivalve.com/newsite/, 1 page.

Minivalve, "Umbrella Valves," May 5, 2021, https://www.minivalve.com/newsite/?option=com_minivalve&product=48&view=minivalve&lang=en&Itemid=52, 1 page.

Notice of Opposition in EP13701414.8, mailed Aug. 18, 2020, 39 pages.

Vernay, "Vernay Control Solutions," accessed Jan. 5, 2024 http://www.vernay.com/Home.aspx, 6 pages.

Wikipedia entry "Li-ion accumulator" Jan. 8, 2019, 22 pages.

Wikipedia entry "Li-ion battery" Jan. 27, 2012, 18 pages.

Wikipedia entry "Polyethylene" Dec. 14, 2011, 7 pages.

"Turning Two into One: Innovative Pressure Compensation for the Batteries of Electric Vehicles", Freudenberg Sealing Technologie, Sep. 13, 2017, https://www.fst.com/-/media/files/pr/2017/2017-09/freudenberg_diavent_press.pdf, 3 pages.

DIAvent, "Values for the Customer" DIAvent Data Sheet, Freudenberg Sealing Technologie, 2019, 1 page.

* cited by examiner

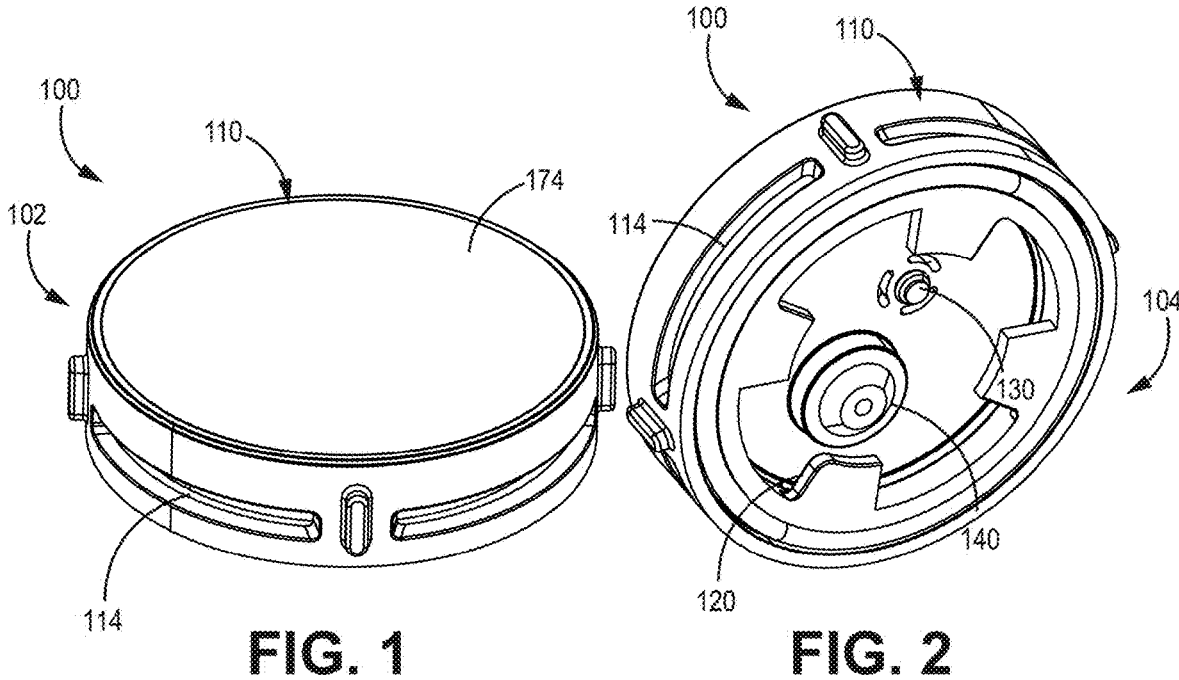
FIG. 1                    FIG. 2
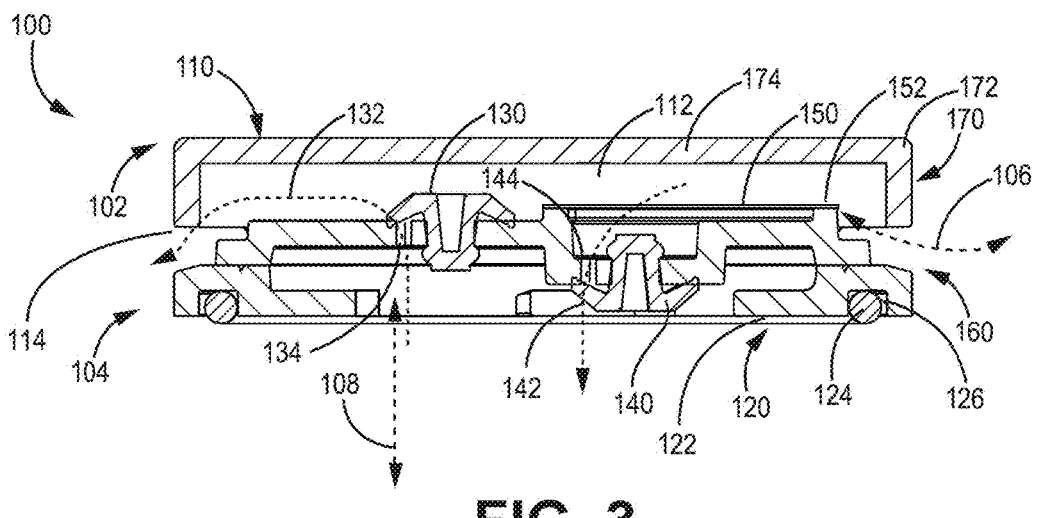
FIG. 3

VENT ASSEMBLY

CROSS REFERENCE TO RELATED APPLICATIONS

This application claims the benefit of U.S. Provisional Application No. 63/298,553, filed 11 Jan. 2022, the disclosure of which is incorporated by reference herein in its entirety.

TECHNOLOGICAL FIELD

The present disclosure is generally related to vent assemblies. More particularly, the present disclosure is related to vent assemblies that are configured for pressure equalization of an enclosure.

SUMMARY

In some aspects, the technology described herein relate to a vent assembly. The vent assembly has a vent body defining a cavity, a first axial end and a second axial end. The vent body has a coupling structure towards the second axial end. An outlet relief valve selectively sealed to the vent body within the cavity, where the outlet relief valve selectively defines an outlet airflow pathway upon a first pressure differential between the first axial end and the second axial end. An inlet relief valve is selectively sealed to the vent body within the cavity, where the inlet relief valve selectively defines an inlet airflow pathway upon a second pressure differential between the first axial end and the second axial end. The outlet relief valve and the inlet relief valve are arranged in parallel relative to airflow through the vent body. A passive airflow vent is disposed in the vent body. The passive airflow vent is arranged in series with the inlet relief valve. The passive airflow vent is arranged in parallel with the outlet relief valve. The vent body forms a cover between the passive airflow vent and an environment outside of the vent body. The cover surrounds the passive airflow vent laterally outward from the passive airflow vent and axially outward from the passive airflow vent. The cover is positioned towards the first axial end.

In some such aspects, the cover extends laterally across the inlet relief valve, the outlet relief valve, and the passive airflow vent. Additionally or alternatively, the cover includes a cohesive barrier. Additionally or alternatively, at least a portion of the cover has a shadowbox configuration. Additionally or alternatively, the vent body defines a tortuous path from the outside environment to the passive airflow vent. Additionally or alternatively, the vent assembly lacks a passive airflow vent in series with the outlet relief valve. Additionally or alternatively, the passive airflow vent includes a breathable membrane that is configured to obstruct liquid water flow therethrough. Additionally or alternatively, the vent body further defines an environmental opening extending between the cavity and the environment outside of the vent body, where the environmental opening is positioned in the axial direction between the second axial end and the passive airflow vent. Additionally or alternatively, the inlet airflow pathway extends from the environmental opening in a first axial direction towards the first axial end of the vent body and then in the opposite axial direction towards the second axial end of the vent body. Additionally or alternatively, the vent body defines a first airflow pathway between outside of the vent body and the cavity towards the first axial end, and a second airflow pathway between the outside of the vent body and the vent body towards the second axial end. The first airflow pathway and the second airflow pathway are in selective airflow communication through the inlet relief valve and the outlet relief valve. Additionally or alternatively, the first pressure differential ranges from −0.25 to −1.1 psi. Additionally or alternatively, the second pressure differential ranges from 0.25 to 1.1 psi. Additionally or alternatively, a sealing surface surrounds the coupling structure.

In some aspects, the technology described herein relate to a vent assembly having a vent body has a base portion and a retainer portion. The base portion defines a perimeter region and a rupture valve opening. The retainer portion engages the base portion around the rupture valve opening. A rupture valve is adhered to the vent body across the rupture valve opening. The rupture valve is compressibly disposed between the base portion and the retainer portion around the rupture valve opening.

In some such aspects, the rupture valve is non-breathable. Additionally or alternatively, an adhesive couples the rupture valve to the vent body. Additionally or alternatively, adhesive is disposed between the base portion and the retainer body. Additionally or alternatively, the adhesive has an inner circumferential boundary on the base portion that forms a polygonal shape. Additionally or alternatively, the adhesive has an inner circumferential boundary that forms a hexagonal shape. Additionally or alternatively, an inner circumferential boundary of the perimeter region of the base portion defines the polygonal shape. Additionally or alternatively, the polygonal shape of the inner circumferential boundary of the perimeter region of the base portion is hexagonal. Additionally or alternatively, the adhesive includes silicone. Additionally or alternatively the vent body is overmolded to the rupture valve in an edge region of the rupture valve. Additionally or alternatively, the edge region has an inner circumferential boundary that defines a polygonal shape.

Additionally or alternatively the rupture valve includes skived PTFE. Additionally or alternatively, the rupture valve is non-porous. Additionally or alternatively, the rupture valve has a thickness from 0.5 mils to 10 mils. Additionally or alternatively, the vent body has a support brace extending across the rupture valve opening, the support brace abutting the rupture valve. Additionally or alternatively, a cover is coupled to the perimeter region of the base portion, the cover including a sidewall extending axially outward from the base portion, and an end face coupled to the sidewall. Additionally or alternatively, the retainer portion is integral to the cover. Additionally or alternatively, the end face is at least 10 mm from the rupture valve in the axial direction. Additionally or alternatively, the end face is no more than 30 mm from the rupture valve in the axial direction.

Additionally or alternatively, the axial distance between the end face and the rupture valve is at least 42% of a cross-dimension of an active area of the rupture valve. Additionally or alternatively, the sidewall and the end face define a lattice structure. Additionally or alternatively, the sidewall defines a tortuous flow path from inside the cover to outside the cover. Additionally or alternatively, at least a portion of the cover has a shadowbox configuration. Additionally or alternatively, the cover defines a total flow area that is greater than a flow area of the rupture valve opening.

In some aspects, the technology described herein relate to a vent assembly having a vent body having a base portion. The base portion defines a perimeter region and a rupture valve opening. A rupture valve is disposed across the rupture valve opening. The rupture valve has an edge region having an inner circumferential boundary. The rupture valve is adhered to the vent body in the edge region. The inner circumferential boundary forms a polygonal shape.

In some such aspects, the vent body is overmolded to the rupture valve in the edge region of the rupture valve. Additionally or alternatively, the inner circumferential boundary of the adhesive is hexagonal. Additionally or alternatively, the assembly has an adhesive disposed between the rupture valve and the base portion, whereby the rupture valve is adhered to the base portion with the adhesive having an inner circumferential boundary. Additionally or alternatively, the inner circumferential boundary of the adhesive is hexagonal. Additionally or alternatively, the rupture valve has an edge region with an inner circumferential boundary having a polygonal shape. According to some such aspects, the polygonal shape is hexagonal. Additionally or alternatively, the rupture valve is non-breathable. Additionally or alternatively, a retainer portion compressibly retains the rupture valve to the base portion around the rupture valve opening, where the retainer portion engages the base portion around the rupture valve opening. Additionally or alternatively, an adhesive is disposed between the base portion and the retainer portion. Additionally or alternatively, an engagement region is defined between the base portion and the retainer portion, and the engagement region has an inner circumferential boundary that defines a polygonal shape. According to some such aspects, the inner circumferential boundary of the engagement region is hexagonal.

Additionally or alternatively, the adhesive includes silicone. Additionally or alternatively, the rupture valve includes skived PTFE. Additionally or alternatively, the rupture valve is non-porous. Additionally or alternatively, the rupture valve has a thickness from 0.5 mils to 10 mils. Additionally or alternatively, the vent body further has a support brace extending across the rupture valve opening, the support brace abutting the rupture valve. Additionally or alternatively, a cover is coupled to the perimeter region of the base portion, the cover including a sidewall extending axially outward from the base portion, and an end face coupled to the sidewall. Additionally or alternatively, the retainer portion is integral to the cover. Additionally or alternatively, the end face is at least 10 mm from the rupture valve in the axial direction.

Additionally or alternatively, the end face is no more than 30 mm from the rupture valve in the axial direction. Additionally or alternatively, the axial distance between the end face and the rupture valve is at least 42% of a cross-dimension of an active area of the rupture valve. Additionally or alternatively, the sidewall and the end face define a lattice structure. Additionally or alternatively, at least a portion of the cover has a shadowbox configuration. Additionally or alternatively, the sidewall defines a tortuous flow path from inside the cover to outside the cover. Additionally or alternatively, the cover defines a total flow area that is greater than a flow area of the rupture valve opening. Additionally or alternatively, the rupture valve has an edge region that is compressibly disposed between the base portion and the retainer portion, and wherein the adhesive is disposed between the base portion and the retainer portion.

In some aspects, the technology described herein relate to a vent assembly having a vent body having cover defining a cavity. The cover has a sidewall and an end face coupled to the sidewall. The sidewall has a shadowbox configuration. A rupture valve is disposed across a rupture valve opening.

In some such aspects, the vent assembly has a base portion having a perimeter region coupled to the cover, where the base portion defines the rupture valve opening.

Additionally or alternatively, the rupture valve opening is defined by a battery housing, and the cover has a retainer portion that is configured to couple to the battery housing. Additionally or alternatively, the vent assembly has an adhesive coupling the rupture valve to the vent body. Additionally or alternatively, a retainer portion is coupled to the base portion, where the rupture valve is compressibly disposed between the base portion and the retainer portion around the rupture valve opening.

Additionally or alternatively, an adhesive is disposed between the base portion and the retainer portion around the rupture valve opening. Additionally or alternatively, the retainer portion is integral to the cover. Additionally or alternatively, the adhesive has an inner circumferential boundary that forms a polygonal shape on the base portion. Additionally or alternatively, the polygonal shape of the inner circumferential boundary is hexagonal. Additionally or alternatively, the rupture valve has an edge region with an inner circumferential boundary defining a polygonal shape. Additionally or alternatively, the polygonal shape of the edge region of the rupture valve is hexagonal. Additionally or alternatively, the rupture valve is non-breathable. Additionally or alternatively, the retainer portion engages the perimeter region of the base portion. Additionally or alternatively, the perimeter region of the base portion has an inner circumferential boundary that defines a polygonal shape. Additionally or alternatively, the polygonal shape of the inner circumferential boundary of the perimeter region of the base portion is hexagonal.

Additionally or alternatively, the adhesive includes silicone. Additionally or alternatively, the rupture valve includes skived PTFE. Additionally or alternatively, the vent body is overmolded to the rupture valve in an edge region of the rupture valve. Additionally or alternatively, the edge region has an inner circumferential boundary that defines a polygonal shape Additionally or alternatively, the rupture valve is non-porous. Additionally or alternatively, the rupture valve has a thickness from 0.5 mils to 10 mils. Additionally or alternatively, the vent body further includes a support brace extending across the rupture valve opening, the support brace abutting the rupture valve. Additionally or alternatively, the end face is at least 10 mm from the rupture valve in the axial direction. Additionally or alternatively, the end face is no more than 30 mm from the rupture valve in the axial direction. Additionally or alternatively, the axial distance between the end face and the rupture valve is at least 42% of a cross-dimension of an active area of the rupture valve. Additionally or alternatively the sidewall and the end face define a lattice structure. Additionally or alternatively, the sidewall defines a tortuous flow path from inside the cover to outside the cover. Additionally or alternatively, the cover defines a total flow area that is greater than a flow area of the rupture valve opening.

In some aspects, the technology described herein relates to a vent assembly having a vent body defining a first axial end and a second axial end. The vent body has a base portion and a coupling structure towards the second axial end. An outlet relief valve is selectively sealed to the vent body. The outlet relief valve selectively defines an outlet airflow pathway upon a first pressure differential between the first axial end and the second axial end. An inlet relief valve selectively sealed to the vent body. The inlet relief valve selectively defines an inlet airflow pathway upon a second pressure differential between the first axial end and the second axial end. The outlet relief valve and the inlet relief valve are arranged in parallel relative to airflow through the vent body. A passive airflow vent is disposed in the vent body. The passive airflow vent is arranged in series with the inlet relief valve. The passive airflow vent is arranged in parallel with the outlet relief valve. A non-breathable rupture valve is disposed across a rupture valve opening defined by the vent body. The non-breathable rupture valve is arranged in parallel with the inlet relief valve and the outlet relief valve.

In some such aspects, the vent body is overmolded to the rupture valve in an edge region of the rupture valve. Additionally or alternatively, the edge region has an inner circumferential boundary that defines a polygonal shape. Additionally or alternatively, the vent assembly has an adhesive coupling the rupture valve to the vent body around the rupture valve opening. Additionally or alternatively, the adhesive has an inner circumferential boundary that forms a polygonal shape on the base portion. According to some such aspects, the inner circumferential boundary of the adhesive has a hexagonal shape. Additionally or alternatively, the adhesive includes silicone. Additionally or alternatively, a retainer portion engages the base portion, where the rupture valve is compressibly disposed between the retainer portion and the base portion around the rupture valve opening. Additionally or alternatively, the adhesive is disposed between the base portion and the retainer portion.

Additionally or alternatively, the retainer portion engages a perimeter region of the base portion. Additionally or alternatively, the perimeter region of the base portion has an inner circumferential boundary that defines a polygonal shape. According to some such aspects, the inner circumferential boundary of the perimeter region of the base portion is hexagonal. Additionally or alternatively, the vent body defines a cavity, and the vent body forms a cover between the cavity and an environment outside of the vent body, where the cover surrounds the cavity laterally outward from the cavity and axially outward from the cavity, wherein the cover is positioned towards the first axial end. Additionally or alternatively, the cover defines a total flow area that is greater than a flow area of the rupture valve opening. Additionally or alternatively, a cover is coupled to a perimeter region of the base portion, wherein a cavity is defined by the base portion and the cover.

Additionally or alternatively, the cover has a sidewall and an end face coupled to the sidewall, where the sidewall has a shadowbox configuration. Additionally or alternatively, the end face is at least 10 mm from the rupture valve in the axial direction. Additionally or alternatively, the end face is no more than 30 mm from the rupture valve in the axial direction. Additionally or alternatively, the axial distance between the end face and the rupture valve is at least 42% of a cross-dimension of an active area of the rupture valve. Additionally or alternatively, the sidewall and the end face define a lattice structure. Additionally or alternatively, the sidewall defines a tortuous flow path from inside the cover to outside the cover. Additionally or alternatively, the retainer portion is integral to the cover. Additionally or alternatively, the rupture valve has an edge region having an inner circumferential boundary that has a polygonal shape. According to some such aspects, the polygonal shape of the inner circumferential boundary of the edge region of the rupture valve is hexagonal.

Additionally or alternatively, the rupture valve includes skived PTFE. Additionally or alternatively, the cover extends laterally across the inlet relief valve, the outlet relief valve, the rupture valve, and the passive airflow vent. Additionally or alternatively, the cover is a cohesive barrier. Additionally or alternatively, at least a portion of the cover has a shadowbox configuration. Additionally or alternatively, the vent body defines a tortuous flow path from the outside environment to the passive airflow vent. Additionally or alternatively, the vent assembly lacks a passive airflow vent in series with the outlet relief valve. Additionally or alternatively, the passive airflow vent comprises a breathable membrane that is configured to obstruct liquid water flow therethrough. Additionally or alternatively, the vent body further defines an environmental opening extending between the cavity and the environment outside of the vent body, where the environmental opening is positioned in the axial direction between the second axial end and the passive airflow vent.

Additionally or alternatively, the inlet airflow pathway extends from the environmental opening in a first axial direction towards the first axial end of the vent body and then in the opposite axial direction towards the second axial end of the vent body. Additionally or alternatively, the vent body defines a first airflow pathway between outside of the vent body and the cavity towards the first axial end, and a second airflow pathway between the outside of the vent body and the vent body towards the second axial end, where the first airflow pathway and the second airflow pathway are in selective airflow communication through the inlet relief valve, the outlet relief valve, and the rupture valve. Additionally or alternatively, the first pressure differential ranges from −0.25 to −1.1 psi. Additionally or alternatively, the second pressure differential ranges from 0.25 to 1.1 psi. Additionally or alternatively, the vent assembly has a sealing surface surrounding the coupling structure. Additionally or alternatively, the rupture valve has a thickness from 0.5 mils to 10 mils. Additionally or alternatively, the vent body has a support brace extending across the rupture valve opening, the support brace abutting the rupture valve.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

FIG. 1 is a first perspective view of an example vent assembly consistent with various embodiments.

FIG. 2 is a second perspective of an example vent assembly consistent with FIG. 1.

FIG. 3 is a cross-sectional view of an example vent assembly consistent with FIGS. 1-2.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Figure 4:
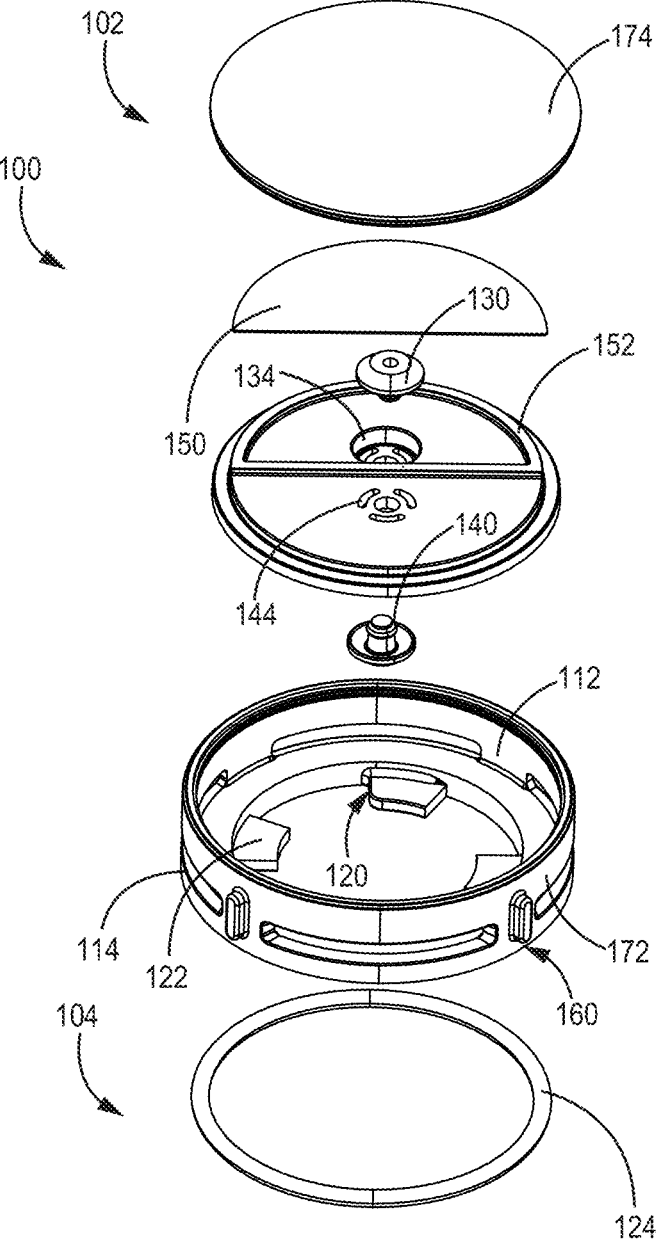
FIG. 4 is an exploded view of an example vent assembly consistent with FIG. 3.

FIG. 1 depicts a first perspective view of an example vent assembly 100 consistent with various embodiments and FIG. 2 depicts a second perspective view of an example vent assembly 100 consistent with FIG. 3 depicts a cross-sectional view of such an example vent assembly 100 and FIG. 4 depicts an exploded view of the vent assembly 100. FIGS. 1-4 can be viewed in conjunction with the following description for clarity. The vent assembly 100 is generally configured to be coupled to an enclosure (not currently depicted), where the enclosure is generally not a component of the vent assembly 100. The vent assembly 100 is generally configured to facilitate selective pressure equalization of the enclosure while preventing the entry of contaminants, such as particles and liquids (such as water), into the enclosure. The enclosure is generally configured to house system components such as electronic components and battery cells, as examples.

The vent assembly 100 generally has a vent body 110, an outlet relief valve 130, an inlet relief valve 140, and a passive airflow vent 150. The vent assembly 100 has a first axial end 102 and a second axial end 104. The vent body 110 has a coupling structure 120 towards the second axial end 104.

The vent body 110 is generally configured to selectively obstruct and facilitate airflow between the first axial end 102 and the second axial end 104. The coupling structure 120 is generally configured to sealably couple to an enclosure about an enclosure opening. The coupling structure 120 is defined towards the second axial end 104 of the vent body 110. The coupling structure 120 is generally configured to engage the enclosure. In the current example, the coupling structure 120 has a bayonet connector 122 that is configured to receive mating features defined by the corresponding enclosure. In some other embodiments, the coupling structure ture 120 has another structure that is configured to mate with a corresponding structure defined by the enclosure. For example, the coupling structure 120 can include a screw thread configured to be received by the enclosure about an enclosure opening. As another example, the coupling structure 120 can include a connector that is configured to frictionally engage an enclosure about an enclosure opening, such as a snap-fit connector. In some embodiments, the coupling structure 120 can be configured to be coupled to the enclosure about an enclosure opening with fasteners such as screws, bolts, pins, or the like. In some such embodiments the vent body 110 can define fastener receptacles that are each configured to receive a fastener that fastens the vent body to the enclosure. In yet other embodiments, the vent body 110 can be configured to be coupled to an enclosure via a weld and/or an adhesive. In some embodiments the vent body 110 can have multiple coupling structures configured to couple to an enclosure either independently or in combination.

In embodiments consistent with the current example, the vent assembly 100 has a sealing region 124 surrounding the coupling structure 120. The sealing region 124 is configured to create a seal between the vent assembly 100 and the enclosure when the vent assembly 100 is coupled to the enclosure. The sealing region 124 can include an elastomeric material such as an elastomeric seal. The sealing region 124 can also include a circumferential groove 126 that is configured to receive the seal. The term "circumferential" is used herein to mean "surrounding" and is not limited to a particular shape. In some embodiments the sealing region 124 has a seal that is one or more surfaces constructed of rubber or another gasketing or sealing material.

The outlet relief valve 130 is generally configured to accommodate pressure release from an enclosure to which the vent assembly 100 is coupled. More particularly, the outlet relief valve 130 selectively defines an outlet airflow pathway 132 upon a first pressure differential between the first axial end 102 and the second axial end 104. The outlet relief valve 130 is generally a one-way valve. The outlet relief valve 130 is generally sealed to the vent body 110. The outlet relief valve 130 is configured to selectively open when the first pressure differential reaches a threshold between the first axial end 102 and the second axial end 104. The first pressure differential can be determined by the particular operating environment within which the vent assembly is configured to operate. In some embodiments the first pressure differential ranges from −0.25 psi to −1.1 psi. In some embodiments the first pressure different ranges from −0.1 psi to −1.5 psi. In various embodiments the outlet relief valve 130 is configured to re-seal upon the pressure differential returning below the threshold.

The outlet relief valve 130 generally does not accommodate passive airflow between the first axial end 102 and the second axial end 104 of the vent assembly 100. The outlet relief valve 130 can have a variety of different configurations consistent with the technology disclosed herein. In some embodiments, the outlet relief valve 130 is an elastomeric valve such as an umbrella valve or a duckbill valve. In the current example the outlet relief valve 130 is an umbrella valve. An "umbrella valve" is defined herein as a valve having a perimetric elastomeric lip that forms a seal with a perimetric surface about a venting opening, where the elastomeric lip is configured to unseal from the perimetric surface at a minimum pressure differential to allow for pressure equalization. One example umbrella valve is a Belleville valve.

In the current example, the outlet relief valve 130 is an axial valve, meaning that the outlet relief valve 130 is configured release airflow in the axial direction. However, in some other embodiments the outlet relief valve 130 is a radial valve, meaning that the outlet relief valve is configured to release airflow radially outward. A radial valve may advantageously increase contaminant ingress protection compared to, for example, some axial valves. A radial valve may advantageously increase fluid flow capacity compared to some axial valves.

The inlet relief valve 140 is generally configured to accommodate pressure release from an outside environment to the enclosure to which the vent assembly 100 is coupled. More particularly, the inlet relief valve 140 selectively defines an inlet airflow pathway 142 upon a second pressure differential between the first axial end 102 and the second axial end 104. The inlet relief valve 140 is generally a one-way valve that facilitates airflow in the opposite direction of the outlet relief valve 130. The inlet relief valve 140 is generally sealed to the vent body 110. The inlet relief valve 140 is configured to selectively open when the second pressure differential reaches a threshold between the first axial end 102 and the second axial end 104. The second pressure differential can be determined by the particular operating environment within which the vent assembly is configured to operate. In some embodiments the second pressure differential ranges from 0.25 psi to 1.1 psi. In some embodiments the second pressure different ranges from 0.1 psi to 1.5 psi. In various embodiments the inlet relief valve 140 is configured to re-seal upon the pressure differential returning below the second pressure differential.

The inlet relief valve 140 generally does not accommodate passive airflow between the first axial end 102 and the second axial end 104 of the vent assembly 100. The inlet relief valve 140 can have a variety of different configurations consistent with the technology disclosed herein. In some embodiments, the inlet relief valve 140 is an elastomeric valve such as an umbrella valve or a duckbill valve. In the current example the inlet relief valve 140 is an umbrella valve. In some other embodiments the inlet relief valve can be a spring-operated valve. In the current example the inlet relief valve 140 is an axial valve. In various embodiments the outlet relief valve 130 and the inlet relief valve 140 are arranged in parallel, where "parallel" is used herein as relative to airflow through the vent body 110.

The passive airflow vent 150 is generally configured to prevent the ingress of outside contaminants to the second axial end 104 from the first axial end 102 through the inlet relief valve 140, particularly when the inlet relief valve 140 is unsealed from the vent body 110. The passive airflow vent 150 is generally disposed in the vent body 110. The passive airflow vent 150 is arranged in series with the inlet relief valve 140. The passive airflow vent 150 is sealably coupled to the vent body 110 around the inlet relief valve 140. The passive airflow vent 150 is positioned between the inlet relief valve 140 and the first axial end 102 of the vent body 110.

The passive airflow vent 150 is arranged in parallel with the outlet relief valve 130 relative to airflow through the vent body. Such a configuration may advantageously reduce restriction of airflow from the second axial end 104 to the first axial end 102 through the outlet relief valve 130. Additionally or alternatively, such a configuration may also prevent fouling of the passive airflow vent 150 from contaminants expelled through the outlet relief valve 130 originating from the enclosure to which the vent assembly 100 is configured to be coupled. In various embodiments, the vent assembly 100 lacks a passive airflow vent in series with the outlet relief valve 130.

The passive airflow vent 150 can be constructed of a variety of different materials and combinations of materials. In various embodiments the passive airflow vent 150 incorporates a breathable membrane. The breathable membrane can be configured to obstruct liquid water flow and accommodate gas flow therethrough. The breathable membrane can be constructed of a variety of different materials and combinations of materials. Breathable membranes include, for example, polyethersulfone (PES), nylon, cellulose acetate, polyvinylidene difluoride (PVDF), polyamide, polycarbonate, and acrylic. In various embodiments the breathable membrane is constructed of porous polytetrafluoroethylene (PTFE). Porous PTFE can be produced through a variety of approaches and combinations of approaches generally known in the art. The passive airflow vent 150 can be a laminate or composite that includes a breathable membrane, such as a PTFE laminated to a woven or non-woven support layer. In some embodiments, the passive airflow vent 150 is a woven fabric or a non-woven fabric. The passive airflow vent 150 can be constructed of hydrophobic material, or the passive airflow vent 150 can be treated to exhibit hydrophobic properties. The passive airflow vent 150 can be constructed of an oleophobic material, or the passive airflow vent 150 can be treated to exhibit oleophobic properties. In one example, the passive airflow vent 150 is a hydrophobic woven or non-woven fabric. In some embodiments the passive airflow vent 150 has a support ring to support the periphery of the venting material. The passive airflow vent 150 can be coupled to the vent body 110 with adhesive or through a weld area, in examples.

The vent body 110 is generally configured to define the inlet airflow pathway 142 (in conjunction with inlet relief valve 140) and the outlet airflow pathway 132 (in conjunction with inlet relief valve 140). In various embodiments, the vent body 110 is also configured to form a cover 170 between one or more of the passive airflow vent 150, the inlet relief valve 140, and the outlet relief valve 130 from the external environment. In the current example, the vent body 110 forms a cover 170 between the passive airflow vent 150 and the environment outside of the vent body 110. In particular, the cover 170 surrounds the passive airflow vent 150 laterally outward from the passive airflow vent 150 and axially outward towards the first axial end 102. In the current example, the cover 170 has a sidewall 172 that surrounds the passive airflow vent 150. Furthermore, the cover 170 extends laterally across the inlet relief valve 140, the outlet relief valve 130, and the passive airflow vent 150. In particular, the cover 170 has an end face 174 coupled to the sidewall 172 that is spaced from the passive airflow vent 150 in the axial direction.

In some embodiments, such as the one depicted, the cover 170 is a cohesive barrier, meaning that the cover 170 does not define openings. In some embodiments, the cover 170 can define openings. In some embodiments the cover 170 can have a shadowbox configuration, which will be described in more detail below. In the current example, vent body 110 defines environmental openings 114 between the cover 170 and a base portion 160 of the vent body 110. The environmental openings 114 extend between outside the vent body 110 and the cavity 112. In the current example, the environmental openings 114 are not aligned with the passive airflow vent 150 in the axial direction, where the "axial direction" is the direction between the first end 102 and the second end 104 of the vent body 110. Such a configuration may advantageously prevent impact of the passive airflow vent 150 by environmental contaminants through the environmental openings 114. The vent body 110 can define a tortuous path between the environmental opening 114 and the passive airflow vent 150, meaning that fluid or debris flowing into the environmental opening 114 cannot directly impact the passive airflow vent 150.

In the current example, the environmental opening 114 is positioned in the axial direction between the second axial end 104 and the passive airflow vent 150. The inlet airflow pathway 142 extends from the environmental opening 114 in a first axial direction towards the first axial end of the vent body 110 and then in the opposite axial direction towards the second axial end 104 of the vent body 110.

In the current example the vent body 110 has a base portion 160. The base portion 160 can define the coupling structure 120 that is configured to be coupled to an enclosure. The base portion 160 can define one or more openings corresponding to each of the airflow pathways extending between the first axial end 102 and the second axial end 104 of the vent assembly 100. The base portion 160 can define an inlet valve opening 144 that is selectively obstructed by the inlet relief valve 140. The base portion 160 can define an outlet valve opening 134 that is selectively obstructed by the outlet relief valve 130. The inlet valve opening 144 and the outlet valve opening 134 can be arranged in parallel relative to airflow through the vent assembly 100.

In the current example, the sidewall 172 is integral with the base portion 160. The end face 174 is coupled to the sidewall 172. In some other embodiments the end face 174 is integral with the sidewall 172. In some embodiments the sidewall 172 is a separate component that is coupled to the base portion 160, some examples of which are described below. In some embodiments the end face 174 is omitted. In some embodiments the sidewall 172 is omitted.

The vent assembly 100 generally defines a first airflow pathway 106 from outside of the vent body 110 to the cavity 112 towards the first axial end 102. The vent assembly 100 defines a second airflow pathway 108 from the outside of the vent body 110 to the vent body 110 towards the second axial end 104. The first airflow pathway 106 and the second airflow pathway 108 are in selective airflow communication through the inlet relief valve 140 (and, therefore the passive airflow vent 150) and the outlet relief valve 130.

In the current example, the vent body 110 has a rim region 152 that surrounds the inlet relief valve 140. The rim region 152 is spaced in the axial direction from the inlet relief valve 140 and the rim region 152 is positioned towards the first axial end 102 relative to the inlet relief valve 140. The passive airflow vent 150 is coupled to the rim region 152 across the inlet relief valve 140.

Figure 5:
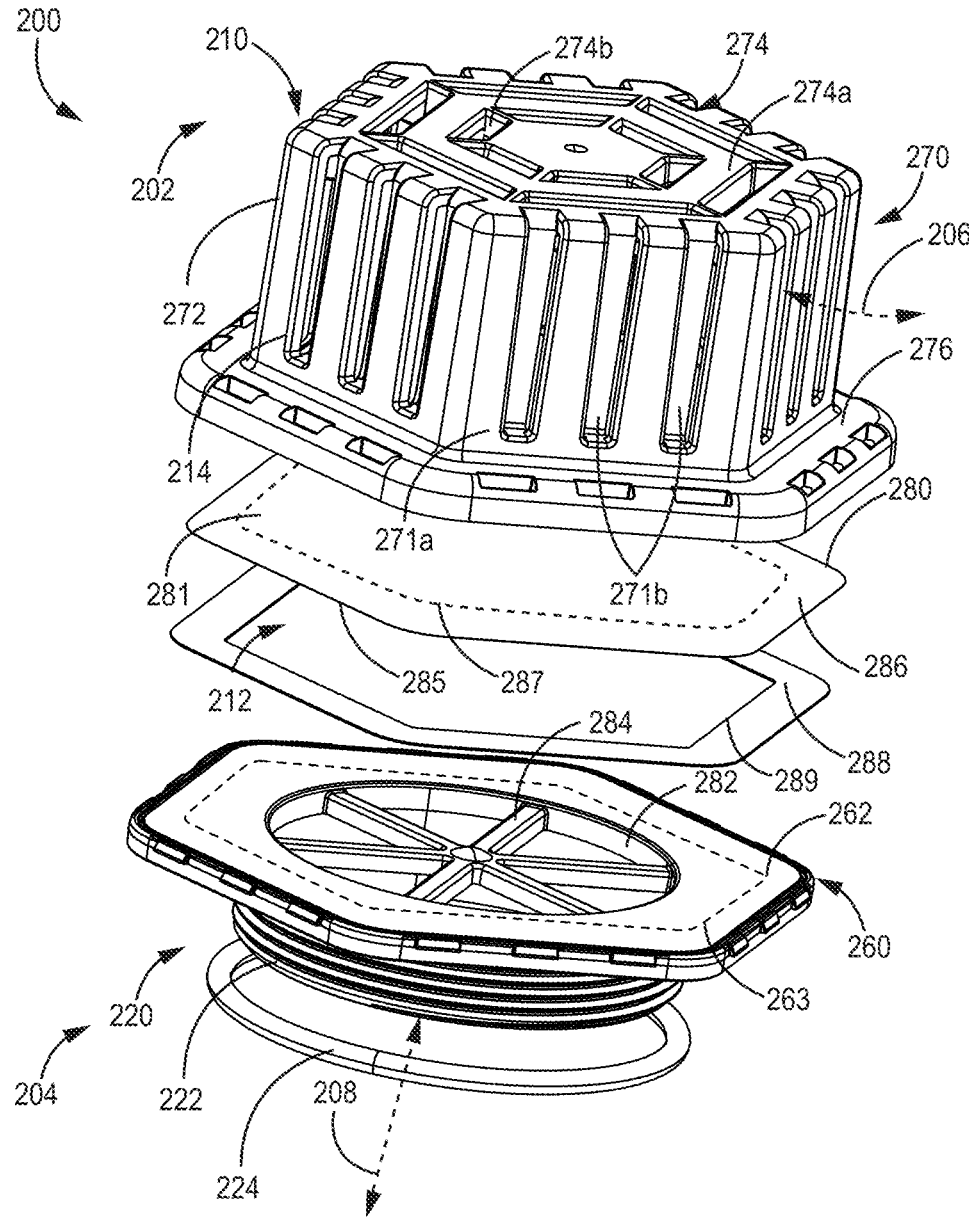
FIG. 5 is an exploded view of another example vent assembly consistent with various embodiments.

FIG. 5 is exploded perspective view of another example vent assembly 200 consistent with various embodiments. The vent assembly 200 is generally configured to provide pressure relief for an enclosure to which the vent assembly 200 is coupled. The vent assembly 200 has a vent body 210 and a rupture valve 280 coupled to the vent body 210. The vent body 210 has a base portion 260 and a retainer portion 276 that is configured to be coupled to the base portion 260. In the current example the vent body 210 has a cover 270 that is integral with the retainer portion 276.

In the current example, the base portion 260 defines a rupture valve opening 282. The rupture valve 280 is disposed across the rupture valve opening 282. In particular, the rupture valve 280 is coupled to the base portion 260 around the rupture valve opening 282. In various embodiments, the rupture valve 280 is compressibly disposed between the base portion 260 and the retainer portion 276 around the rupture valve opening 282. In the current example, the base portion 260 has a perimeter region 262. The rupture valve 280 extends across the rupture valve opening 282 and at least a portion of the perimeter region 262. The retainer portion 276 engages base portion 260 around the rupture valve opening 282.

The rupture valve 280 is generally configured to obstruct airflow between the first axial end 202 and the second axial end 204 of the vent body 210 under normal operating conditions. The rupture valve 280 is also generally configured to facilitate rapid airflow from the second axial end 204 to the first axial end 202 through the vent body 210 upon a threshold rupture pressure differential between the second axial end 204 and the first axial end 202. The vent assembly 200 defines a first airflow pathway 206 between outside of the vent body 210 and the cavity 212 towards the first axial end 202, and a second airflow pathway 208 between the outside of the vent body 210 and the vent body towards the second axial end 204. The first airflow pathway 206 and the second airflow pathway 208 are in selective airflow communication through the rupture valve 280.

In examples consistent with the current embodiment, the retainer portion 276 engages the perimeter region 262 of the base portion 260. In various embodiments the retainer portion 276 frictionally engages base portion 260, such as the perimeter region 262 of the base portion 260. For example, the retainer portion 276 can form an interference fit such as a snap fit connection with the base portion 260. An engagement region is defined between the base portion 260 and the retainer portion 276. In various embodiments the engagement region is the perimeter region 262. In various embodiments, the inner circumferential boundary 263 of the engagement region (and, therefore, the inner circumferential boundary 263 of the perimeter region 262) defines a polygonal shape. "Polygonal" is defined as having at least three side regions that form a closed loop, where each side region has two ends, and each end of each side region meets an adjacent side region at a corner region to form an angle. It is noted that the corner regions can be rounded corners, which is depicted in the current examples, but in some embodiments the corner regions can be relatively sharp corners. It is also noted that the side regions need not define straight lines. In this particular example the engagement region/perimeter region 262 have an inner circumferential boundary that defines a hexagonal shape.

The retainer portion 276 is generally configured to engage the base portion 260 around the rupture valve opening 282 to retain the rupture valve 280 to the base portion 260 around the rupture valve opening 282. In various embodiments, engagement between the base portion 260 and the retainer portion 276 results in a compression force on the rupture valve 280. In the current example, the rupture valve 280 has an edge region 286 that is compressibly disposed between the base portion 260 and the retainer portion 276. In various embodiments, the inner circumferential boundary 287 of the edge region 286 has a polygonal shape. In some embodiments the edge region 286 of the rupture valve 280 is coextensive with the perimeter region 262 of the base portion 260. As such, in this example the rupture valve 280 has a polygonal shape, meaning that the outer circumferential boundary 285 of the edge region 286 around the rupture valve 280 forms a polygon. In this particular example, the rupture valve 280 has a hexagonal shape. The rupture valve 280 can have other shapes, such as circular, ovular, triangular, and the like. In some embodiments the rupture valve can be non-polygonal.

In various embodiments, an adhesive 288 is disposed between the rupture valve 280 and the base portion 260 around the rupture valve opening 282 to couple, and more specifically adhere, the rupture valve 280 to the base portion 260 with the adhesive 288. The term "adhere" is used herein to encompass coupling through adhesive, a weld, and over-molding. In some embodiments, an adhesive can additionally or alternatively be disposed between the rupture valve 280 and the retainer portion 276 to couple the rupture valve 280 to the cover 270. The adhesive 288 can be disposed in the edge region 286 of the rupture valve 280. As such, the adhesive 288 can be disposed between the base portion 260 and the retainer portion 276.

In example consistent with the current embodiment, an inner circumferential boundary 289 of the adhesive 288 (which can be the same as the inner circumferential boundary 287 of the edge region of the rupture valve 280) forms a polygonal shape that is consistent with the shape of the inner circumferential boundary 263 of the engagement/perimeter region 262 of the base portion 260. In the current example, the outer circumferential boundary of the adhesive 288 forms a polygonal shape that is consistent with the shape of the outer circumferential boundary of the rupture valve 280. The adhesive 288 can be one or more of a variety of different types of adhesives. In some embodiments the adhesive 288 is a pressure-sensitive adhesive. In some embodiments adhesive 288 is a double-sided adhesive tape. One such example is an acrylic-based pressure sensitive adhesive, such as Acrylic Adhesive 300MP from 3M™ of St. Paul, Minnesota, USA. Another such example is a silicone-based pressure sensitive adhesive. A commercially available example of a silicone-based pressure sensitive adhesive is a double-sided adhesive ARclad® 8458 from Adhesives Research® Glen Rock, Pennsylvania, USA. In some embodiments the adhesive is a curable adhesive material such as silicone-based adhesive.

In some embodiments, the rupture valve 280 can alternatively or additionally be adhered to the base portion 260 via a weld, such as a thermal weld or an ultrasonic weld. In such examples, the edge region 286 of the rupture valve 280 and the perimeter region 262 of the base portion 260 and/or the retainer portion 276 can define a weld area where material forming the edge region 286 of the rupture valve 280 and the material forming the perimeter region 262 of the base portion 260 and/or the retainer portion 276 are melted and solidified to mutually engage.

In yet other embodiments, the vent body 210 can be overmolded to the edge region 286 of the rupture valve 280. For example, the base portion 260 can be overmolded to the edge region 286 of the rupture valve 280 to couple the rupture valve 280 to the valve body 210. In some other embodiments, the retainer portion 276 can be overmolded to the edge region 286 of the rupture valve 280 to couple the rupture valve 280 to the valve body 210. In such examples, the vent body 210 can be configured to exert compression on the edge region 286 of the rupture valve 280. Such compression can be a result of, for example, the coupling of the retainer portion 276 to the base portion 260. In such an example, the edge region 286 of the rupture valve 280 may still be considered compressed between the base portion 260 and the retainer portion 276 even if one of the retainer portion 276 or the base portion 260 does not make direct contact with the rupture valve 280. It is noted that, in some examples, such as examples where the rupture valve 280 is overmolded to the vent body 210, the base portion 260 and the retainer portion 276 can define a single, cohesive component that is overmolded to the rupture valve 280.

The combination of coupling the edge region 286 of the rupture valve 280 to the vent body 210, such as the base portion 260 of the vent body 210, and compressing the edge region 286 of the rupture valve 280 between the retainer portion 276 and the base portion 260 to secure the edge region 286 of the rupture valve may advantageously improve the likelihood of a "clean" failure by the valve. A "clean" failure is used herein to mean that the edge region 286 of the rupture valve 280 remains secured to the vent body 210, and the area of the rupture valve 280 central to the edge region 286 bursts open such that at least 70%, 80% or 85% of the active area 281 of the film accommodates unrestricted airflow through the vent body. The "active area" is defined as the area of the valve that is available for burst failure, which is central to the inner circumferential boundary 287 of the edge region 286. A clean failure may advantageously clear the valve opening of any portions of a partially failed rupture valve that may have otherwise obstructed airflow, which can maximize airflow through the valve opening. Using a retainer portion in addition to the adhesive may reduce the likelihood of adhesive failure, where adhesive failure has an increased likelihood of not being a "clean" failure. Furthermore, it has been discovered that an active area 281 defined by the inner circumferential boundary 287 of the adhesive region and/or engagement region 262 that is polygonal may advantageously reduce the differential pressure required to cause failure in a rupture valve. This can be desirable in particular operating environments.

Figure 16:
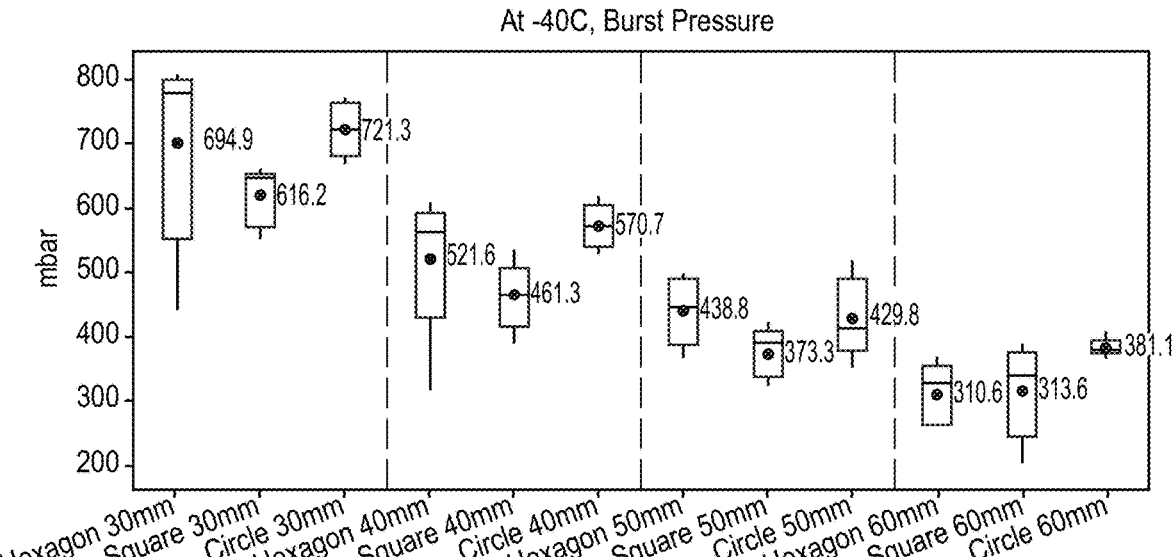
FIG. 16 depicts test results of burst pressure threshold of example rupture valves at −40° C.
Figure 17:
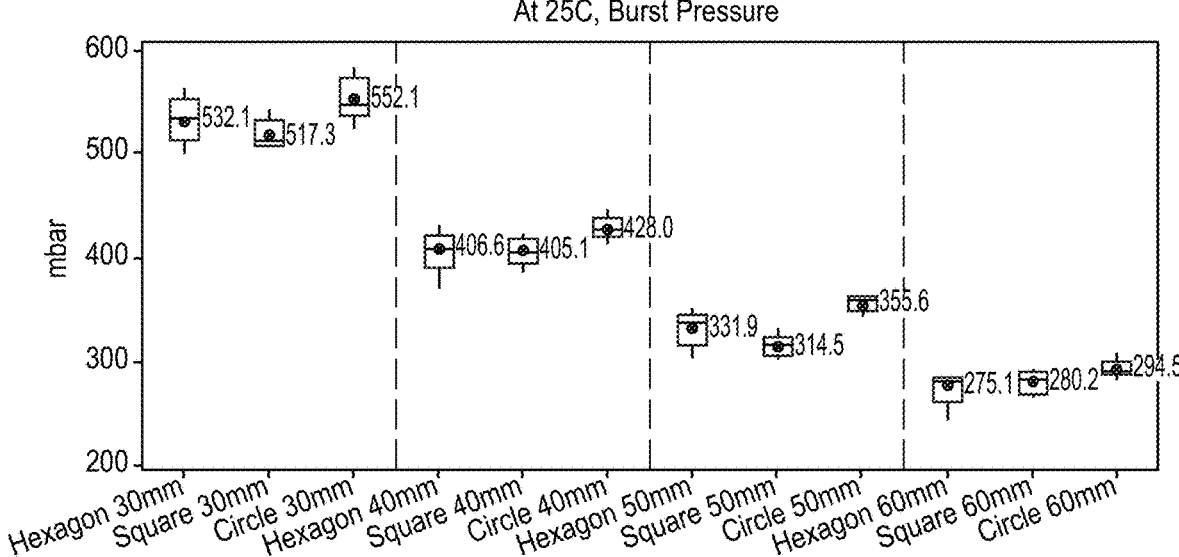
FIG. 17 depicts test results of burst pressure threshold of example rupture valves at 25° C.
Figure 18:
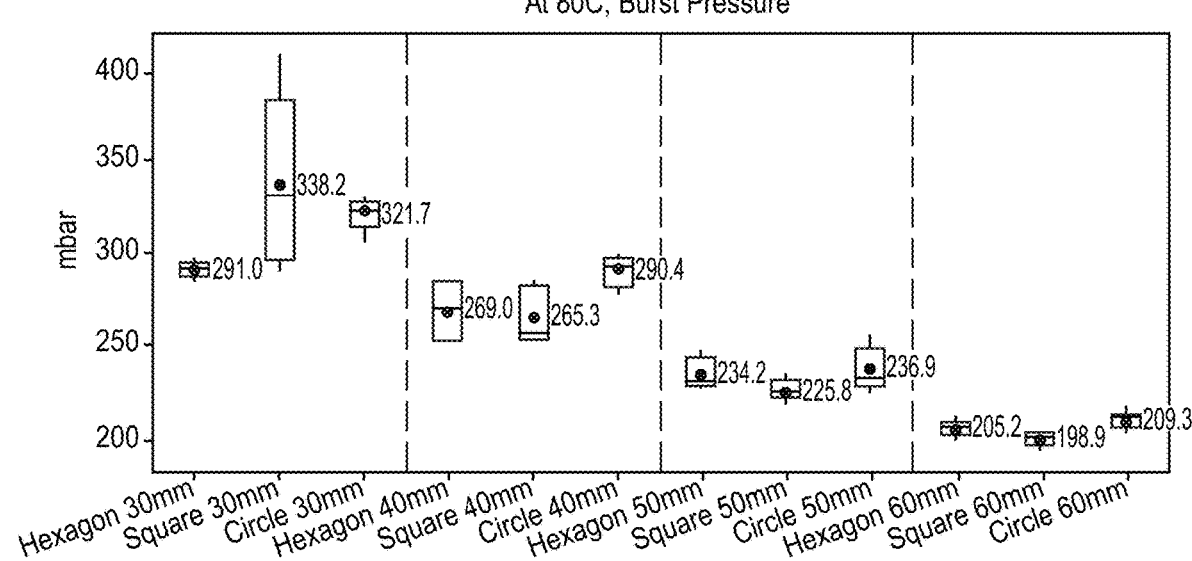
FIG. 18 depicts test results of burst pressure threshold of example rupture valves at 80° C.

FIGS. 16-18 depict test data associated with the burst pressure of rupture valves having active areas with different shapes and sizes. In particular, rupture valves having a hexagonal, square, and circular active areas with comparable sizes are compared. The size of the active area of the circular rupture valve is the diameter, and the size of the active area of the hexagonal and square rupture valve is the dimension across opposing sides of the active area. Each of the rupture valves are constructed of an identical non-breathable PTFE film. Each rupture valve is compressed between two fixture plates that have identical open areas defining the active area of the valve. A pressure differential is introduced across the fixture plates, which is increased at a constant rate (250 mbar/second) until the rupture valve fails, and the burst pressure is recorded. Each size of rupture valve was tested with five unique samples. The data associated with testing the rupture valves at a temperature of −40° C. is depicted in FIG. 16. The data associated with testing the rupture valves at a temperature of 25° C. is depicted in FIG. 17. The data associated with testing the rupture valves at a temperature of 80° C. is depicted in FIG. 18.

As demonstrated by the data, rupture valves having a square or hexagonal active area shape generally have a burst pressure threshold that is slightly lower than the burst pressure threshold of a rupture valve having a circular active area. It is noted that with an increasing number of corner regions/side regions, pressure distribution across the rupture valve may approach that of a rupture valve having a circular shape, which may increase the required pressure for valve failure. As such, in some embodiments the polygonal shape has a maximum number of corners/sides of 10 and in some embodiments a maximum number of corners/sides of 8.

Returning to FIGS. 5-6, it should be appreciated that, in various implementations, a rupture valve 280 having a circular or ovular active area 281 will meet the operational requirements of the assembly 200. As such, any of the embodiments described herein can incorporate a rupture valve 280 having a circular (or ovular) active area, such as having a circular inner circumferential boundary of the edge region 286 of the rupture valve 280 and/or having a circular inner circumferential boundary 263 of the engagement region 262 of the base portion 260.

The rupture valve 280 can be constructed of a variety of different materials and combinations of materials. Generally, the rupture valve 280 is constructed of a polymeric layer. In a variety of implementations, it can be desirable to use a polymer that is resistant to corrosion in the intended operating environment of the rupture valve 280. In a variety of implementations, it is desirable to use a material that has a relatively high fatigue resistance and durability to prevent premature failure in response to environmental pressure differential cycles over the course of its useful life. In various embodiments the rupture valve 280 is non-porous. In various embodiments the rupture valve 280 is non-breathable, meaning that there is no measurable airflow through the rupture valve 280 at room temperature with 20 mbar pressure differential as measured in accordance with ASTM D737-18. In some embodiments the rupture valve 280 has a moisture vapor transmission rate of 0.0 at 73° F. and 50% relative humidity in accordance with ASTM E96-00 (2021). In various embodiments the rupture valve 280 is liquid impermeable.

A non-porous/non-breathable rupture valve may advantageously increase the failure rate of the valve, which may advantageously increase the likelihood of a "clean" failure, which has been described above. In particular, an increasing pressure differential across a porous/breathable material increases more slowly compared to an equally increasing pressure differential across a non-porous/non-breathable material because the non-porous/non-breathable material does not allow for airflow that would contribute to equalization of the pressure differential. Furthermore, a porous/breathable rupture valve may experience pore expansion as a result of the pressure differential, which may decrease the likelihood of a "clean" failure. A non-porous/non-breathable rupture valve also may advantageously exclude contaminants from entering the enclosure, where contaminants include moisture vapor and dust.

In some embodiments the rupture valve 280 is constructed of PTFE. In some such embodiments the rupture valve 280 can be an unexpanded PTFE. In some such embodiments the rupture valve 280 can be a non-porous PTFE. In some embodiments the PTFE is skived PTFE. In some embodiments the PTFE is a cast PTFE. PTFE materials may advantageously have relatively high thermal and mechanical stability compared to some other materials. Other types of polymeric materials are also contemplated.

The rupture valve 280 can have a thickness of at least 0.5 mils, where the thickness is measured by applying a pressure of 0.56 psi using a 1.129-inch presser foot with 8 oz weight added on top of an AMES 3 W dial comparator thickness measurement device manufactured by B.C. Ames Incorporated based in Framingham, Massachusetts. Generally the rupture valve 180 can have a thickness up to 10 mils. In various embodiments, the rupture valve 180 has a thickness from 1 mil to 5 mils; 1 mil to 3 mils, or 0.5 mils to 3 mils. In some embodiments the rupture valve 280 has a thickness of 1 mils. Depending on the particular materials used to construct the rupture valve, the minimum thickness of the rupture valve 280 can be less than 0.5 mils, such as a thickness of at least 0.1 mils, 0.2 mils, or 0.3 mils.

In various examples, the vent body 210 has a support brace 284 extending across the rupture valve opening 282. Generally, the support brace 284 is configured to provide structural support to the rupture valve 280. In various embodiments, the support brace 284 abuts the rupture valve 280 across at least a portion of the rupture valve opening 282. In the current example, the rupture valve opening 282 has a flow area that is the area encompassed by the outer perimetric boundary of the rupture valve opening 282 minus the area of the support brace(s) across the rupture valve opening 282. It is noted that the outer perimetric boundary of the rupture valve opening 282 can generally have a variety of different shapes and is not particularly limited. In the current example, the outer perimetric boundary is circular.

Figure 6:
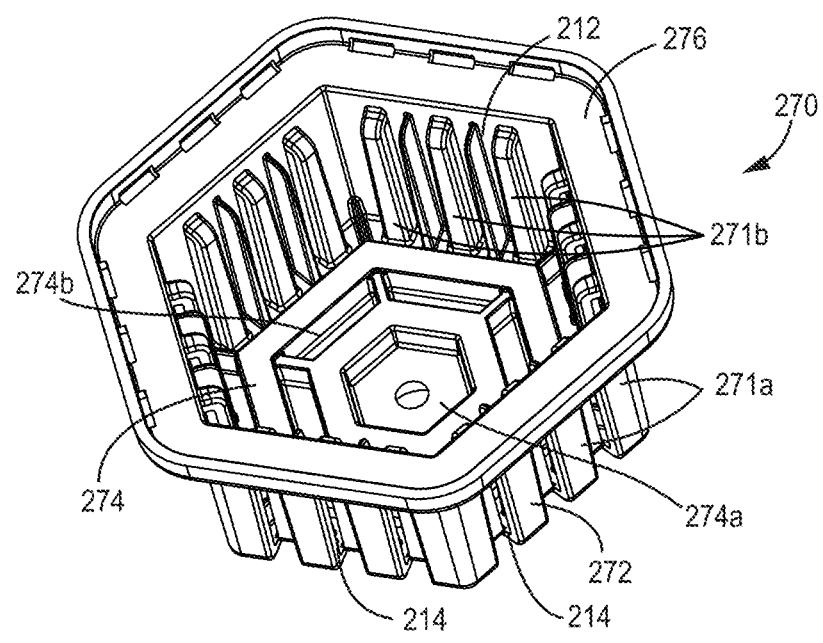
FIG. 6 is a perspective view of an example cover consistent with the example of FIG. 5.

As mentioned above, in the current example, the vent body 210 has a cover 270, where a second perspective view of the cover 270 is depicted in FIG. 6, which can be viewed in conjunction with FIG. 5 for the following description. The cover 270 is generally positioned between the cavity 212 and the environment outside of the vent body 210. The cover 270 is positioned between the rupture valve 280 and the environment outside of the vent body 210. The cover 270 generally surrounds the rupture valve 280 laterally outward from the rupture valve 280 and axially outward from the rupture valve 280. The cover 270 extends laterally across the rupture valve 280. In the current example, the cover 270 is positioned towards the first axial end 202 of the vent assembly 200. The cover 270 is coupled to a perimeter region 262 of the base portion 260. More particularly, the retainer portion 276, which is integral to the cover 270 in this example, is coupled to the perimeter region 262 of the base portion 260. A cavity 212 is defined by the base portion 260 and the cover 270. The cover 270 has a sidewall 272 and an end face 274 coupled to the sidewall 272. In various embodiments the cover is not integral with the retainer portion 276. In some embodiments the cover is omitted.

The sidewall 272 can have a variety of different configurations. In various embodiments, the sidewall 272 is positioned radially outward from the active area of the rupture valve 280. The sidewall 272 generally surrounds the active area 281 of the rupture valve 280 in the lateral direction. In various embodiments, the sidewall 272 can define a lattice structure, where a "lattice" is defined as a repeating series of openings formed by the structure of the sidewall 272. In various embodiments the sidewall 272 defines a tortuous flow path from inside the cover 270 to outside the cover 270. In the current example, the sidewall 272 is formed by an outer wall 271a extending between the base portion 260 and the end face 274. More particularly, the outer wall 271a extends from the retainer portion 276 to the end face 274. The outer wall 271a defines a plurality of outer sidewall openings 271c that are laterally spaced apart on the sidewall 272. The sidewall 272 also has inset segments 271b that each extend across an outer sidewall opening 271c. The inset segments 271b are inset towards the cavity 212 compared to the outer wall 271a at a particular depth.

In some embodiments the inset segments 271b and the outer wall 271a overlap in space such that the lateral width and/or axial length of the inset segments is equal to or greater than the lateral width and/or the axial length of the outer sidewall openings 271c. While in the current example each of the plurality of inset segments 271b and outer sidewall openings 271c are generally elongate and extend axially, in some other embodiments the elongate length of each of the plurality of inset segments 271b and outer sidewall openings 271c can extend in another direction such as laterally. In yet other embodiments the plurality of inset segments 271b and/or the outer sidewall openings 271c are not elongate. In some embodiments inset segments 271b can be omitted.

In the current example, environmental openings 214 of the sidewall 272 are defined by the space between the inset segments 271b and the outer wall 271a to create a tortuous flow path between the cavity 212 and the outside environment. In the current disclosure, the sidewall 272 is referred to herein as having a "shadowbox configuration," where the inset segments 271b overlap with corresponding outer wall openings to create a tortuous flow path between the outside environment and the cavity 212. In this example, the inset segments 271b are spaced in the lateral direction from the outer wall 271a. The environmental openings 214 are positioned between the inset segments 271b and the outer wall 271a.

The end face 274 of the cover 270 is generally spaced from the base portion 260 in the axial direction. More particularly, the end face 274 of the cover 270 is spaced from the rupture valve 280 at a particular axial distance that facilitates failure of the rupture valve 280. If the end face 274 is too close to the rupture valve 280, then the end face 274 may provide support to the rupture valve 280 and prevent failure of the rupture valve 280. If the end face 274 is too far from the rupture valve 280, then the vent assembly 200 may be too large to accommodate certain operating environments. In various embodiments, the end face 274 is at least 10 mm from the rupture valve 280 in the axial direction. In some embodiments, the end face 274 is no more than 70 mm, 50 mm, or 30 mm from the rupture valve 280 in the axial direction. In various embodiments an end face 274 can be omitted.

Data reflecting the maximum expansion of a rupture valve leading to failure was collected for rupture valves having a hexagon-shaped or square-shaped active area across a temperature range from –40° C. to 85° C., and it was determined that such valves generally expand a maximum axial distance that is 42% or less of the cross-dimension of the active area of the rupture valve. As such, for some embodiments of the technology disclosed herein, the axial distance between the end face 274 and the rupture valve 280 is at least 42% of the cross-dimension of the active area 281 of the rupture valve.

Similar to the sidewall 272, in the current example the end face 274 has a shadowbox configuration. In particular, the end face 274 has an outer face 274a defining a plurality of outer face openings 274c. The end face 274 has a plurality of corresponding inset segments 274b that are axially inset from the outer face 274a. Each of the inset segments 274b laterally align with the corresponding outer face opening 274c in the axial direction. The space between the inset segments 274b and the outer face 274a defines a tortuous flow path from outside the vent assembly 200 to the cavity 212.

The cover 270 generally defines a total flow area that is greater than the flow area of the rupture valve opening 282. In some embodiments the total flow area is at least 20%, 30% or 40% greater than the flow area of the rupture valve opening 282. Such a configuration advantageously prevents restriction of airflow by the cover 270 upon failure of the rupture valve 280. In the current example, the flow area of the cover 270 is calculated based on the flow area available between the outer wall 271a and its corresponding inset segments 271b and the outer face 274a and its corresponding inset segments 274b. The flow area of the cover 270 is generally a balance between (1) preventing impact between environmental contaminants (such as liquid spray and debris) and the rupture valve 280 and (2) limiting restriction on airflow upon bursting of the rupture valve 280.

Similar to the examples described with reference to FIGS. 1-4, the example vent assembly 200 of FIG. 5 has a vent body 210 defining a cavity 212. The vent assembly 200 has a first axial end 202 and a second axial end 204. The vent body 210 has a coupling structure 220 towards the second axial end 204. In the current example, the coupling structure 220 includes outer circumferential screw threads 222 defined on the second axial end 204 of the vent assembly 200. The outer circumferential screw threads 222 are configured to engage mating threads about an opening on an enclosure (for example), to couple the vent assembly to the enclosure. Alternate coupling structures can also be used, such as those described above with reference to FIGS. 1-4.

The vent assembly 200 has a sealing region 224 surrounding the coupling structure 220 that is configured to form a seal between the vent assembly 200 and the enclosure onto which the vent assembly 200 is installed. Here the sealing region 224 is an elastomeric sealing ring.

It is noted that unlike the embodiments described above with reference to FIGS. 1-4, in this example the vent assembly 200 lacks an outlet flow valve, an inlet flow valve, and a passive airflow vent. In some embodiments, however, one or more such components can be incorporated into the vent assembly 200.

In some embodiments of the current technology, the base portion 260 can be omitted. In such an embodiment, the rupture valve can be directly coupled to a wall of an enclosure (such as an electronics enclosure or a battery housing) around a rupture valve opening defined by the wall of the enclosure. The rupture valve can be coupled to the wall of the enclosure with adhesive or by a weld, as examples. The cover 270 can be directly coupled to the enclosure wall such that the rupture valve 280 is positioned in the cavity defined by the cover 270. In such an example, the cover 270 can define a coupling feature that is configured to couple to the enclosure wall around the rupture valve 280. In such embodiments the cover can be coupled to the enclosure wall with the use of fasteners (such as bolts, screws, or rivets) and/or via adhesive and/or a welded region. In such embodiments the cover can define a retainer portion 276 as described, but the retainer portion is configured to engage the enclosure wall (rather than the base portion 260) to exert compression on the edge region 286 of the rupture valve 280.

Figure 7:
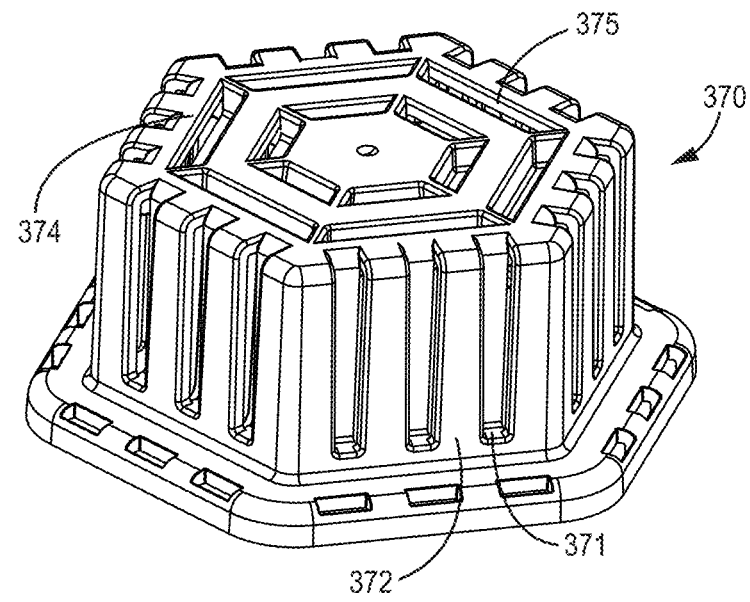
FIG. 7 is a perspective view of another example cover consistent with embodiments.

FIG. 7 depicts an alternate configuration of a cover 370 that can be used in conjunction with the base portion depicted in FIG. 5. In the current example, the cover 370 does not have a shadowbox configuration but is otherwise consistent with the cover depicted in FIGS. 5 and 6 and the corresponding description, which is incorporated by reference into the current discussion except where contradictory to the current description or figure. In the current example, the sidewall 372 has a series of sidewall openings 371 that are unobstructed. The end face 374 has a series of end face openings 375 that are unobstructed. As such, the combined area of each of the sidewall openings 371 and the end face openings 375 is the flow area of the cover 370.

Figure 15:
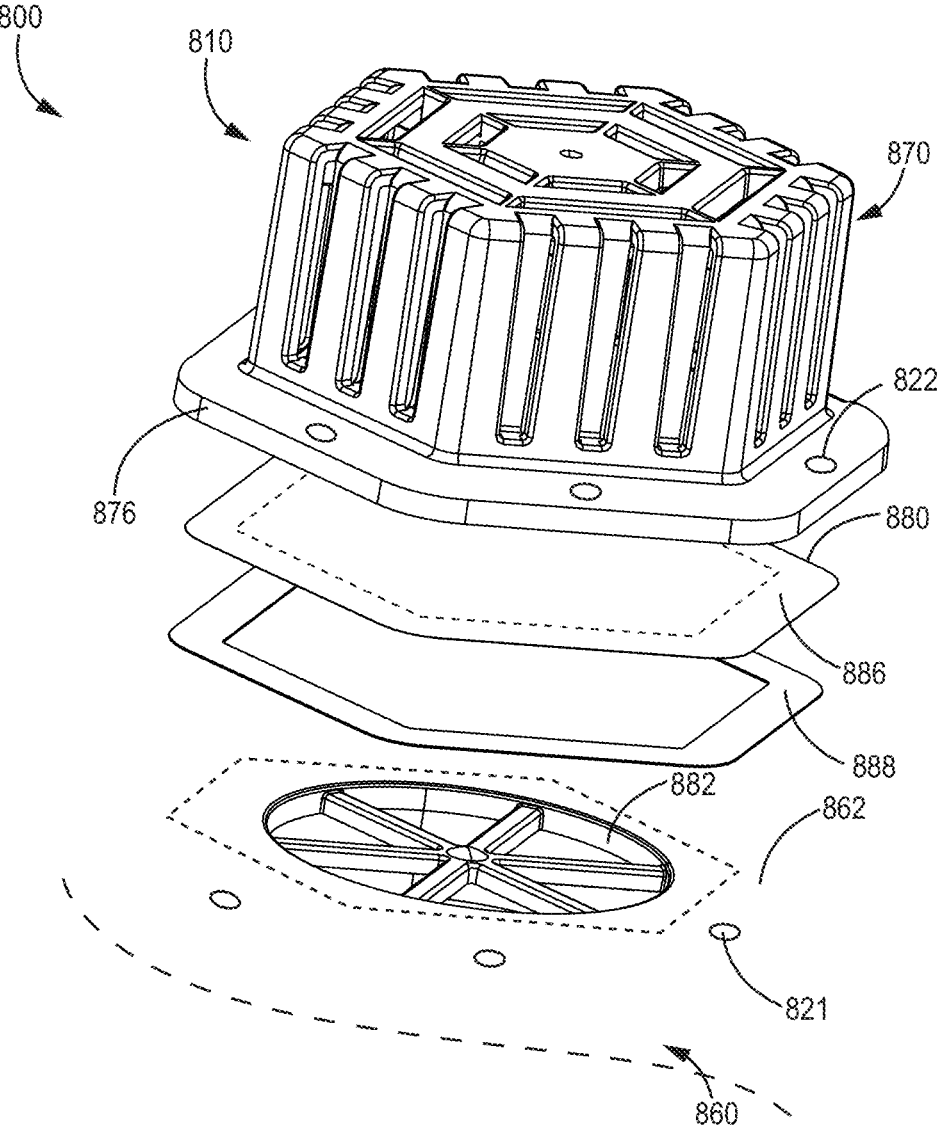
FIG. 15 is an exploded view of an alternate vent assembly consistent with embodiments.

FIG. 15 depicts an alternate configuration of a vent assembly 800 that is generally consistent with FIGS. 5-6 as described above, which is incorporated by reference into the current discussion except where contradictory to the current description or figure. In this example, however, the base portion is omitted and the valve body 810 has a retainer portion 876 that may be a component of a cover 870. In some embodiments the valve body 810 also omits the cover 870, however, which is described in more detail below. In the current example, the rupture valve 880 is configured to be coupled to a wall of an enclosure 860, a portion of which is visible. The enclosure can be an electronics enclosure or a battery housing, as examples. The enclosure wall 860 defines a rupture valve opening 882. A rupture valve 880 is configured to be coupled to the enclosure wall 860 similarly to how rupture valves can be coupled to base portions, discussed elsewhere herein. In some embodiments the rupture valve 880 is coupled to the retainer portion 876. The rupture valve 880 can be consistent with the discussions of other example rupture valves herein.

In embodiments incorporating a cover, the cover 870 is consistent with example covers discussed elsewhere herein, which is incorporated by reference into the current discussion except where contradictory to the current description or figure. In some embodiments the rupture valve 880 is positioned in a cavity defined by the cover 870. In some other embodiments, the cover 870 is positioned axially outward from the rupture valve 880 such as in examples where the rupture valve 880 is coupled to an interior surface of the enclosure wall and the cover is coupled to an exterior surface of the enclosure wall. In examples consistent with the current figure, the cover 870 is configured to be directly coupled to the enclosure wall 860.

The retainer portion 876 has a coupling structure 820 that is configured to couple to the enclosure wall 860. The coupling structure 820 can have other configurations, such as configurations described elsewhere herein. It will be appreciated, however, that since a base portion is omitted in this example, the coupling structure 820 would be defined by the retainer portion 876. In this specific example, the retainer portion 876 has a coupling structure 820 that includes a fastener receptacle 822 that is configured to laterally align with a mating receptacle 821 defined by the enclosure wall 860 in the axial direction. In such embodiments the retainer portion 876 can be coupled to the enclosure wall 860 with the use of fasteners (such as bolts, screws, or rivets) that are mutually received by the fastener receptacle 822 and the mating receptacle 821. In some other embodiments the retainer portion 876 can be coupled to the enclosure wall 860 via adhesive or a welded region. In yet other embodiments the retainer portion 876 can define a bayonet connector or screw threads that is configured to engage the enclosure wall 860, as described elsewhere herein with respect to a base portion.

In examples lacking a base portion, the retainer portion 876 can be configured to engage the enclosure wall 860 in an engagement region 862 surrounding the valve opening 882. The retainer portion 876 and the enclosure wall 860 can be configured to exert compression on an edge region 886 of the rupture valve 880 within the engagement region 862. The adhesive 888 is configured to be disposed between the retainer portion 876 and the enclosure wall 860. In the current example, the retainer portion 876 extends laterally outward from the sidewall 872 of the cover 870. In some other embodiments, the adhesive 888 can be omitted and the retainer portion 876 can be overmolded to the edge region 886 of the rupture valve 880. In such examples the retainer portion 876 of the vent body 810 is adhered to the rupture valve 880 in an overmolded area such as the edge region 886 of the rupture valve 880. The coupling of the retainer portion 876 and the enclosure wall 860 can result in compression on the edge region 886 of the rupture valve 880.

Figure 8:
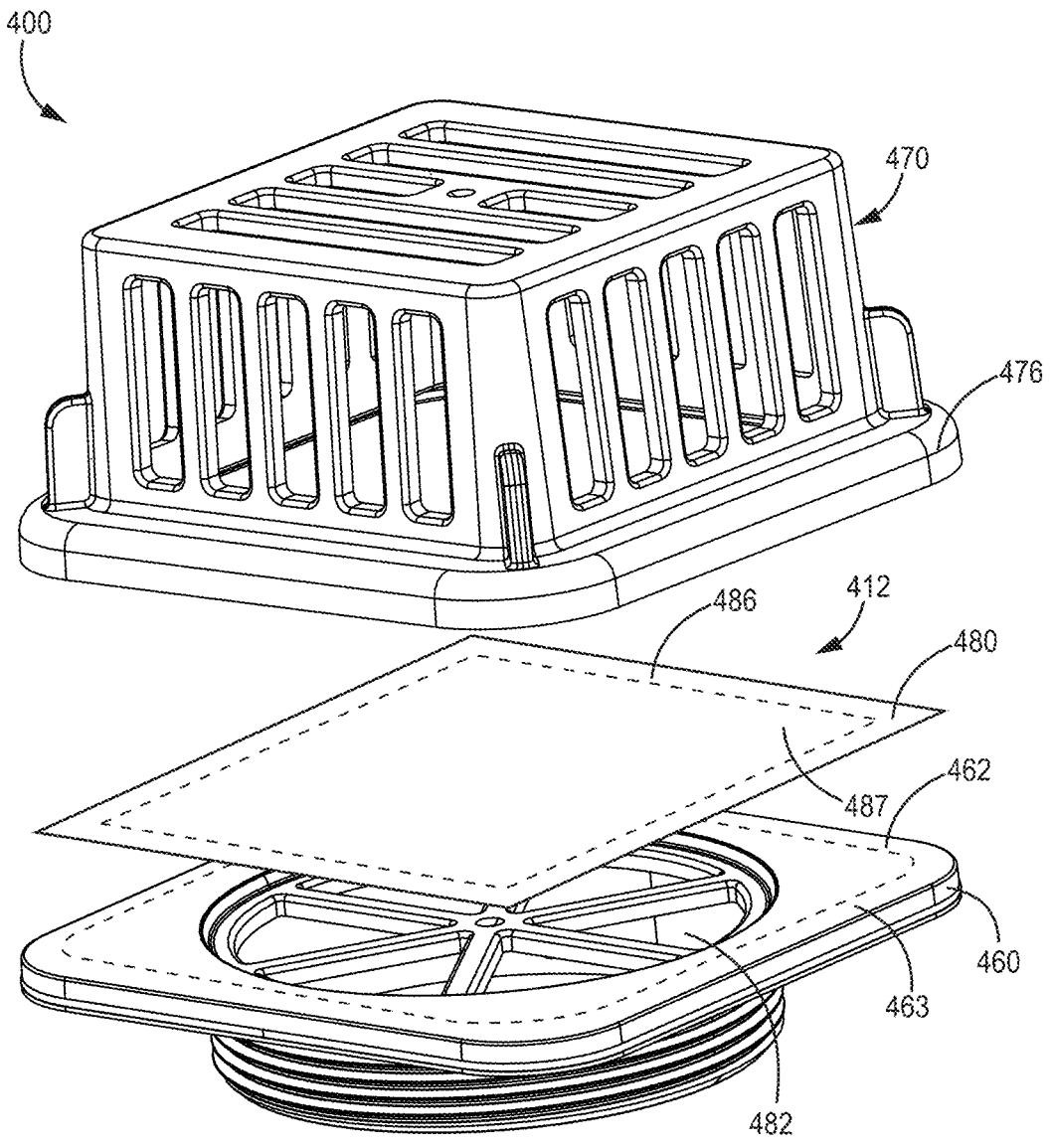
FIG. 8 is a perspective exploded view of another example vent assembly consistent with various embodiments.

FIG. 8 depicts an alternate configuration of a vent assembly 400 consistent with various embodiments. The vent assembly 400 is generally consistent with the description above with respect to FIGS. 5-7, which is incorporated by reference into the current discussion except where contradictory to the current description or figure. Similar to the cover 470 described above with reference to FIG. 7, here the cover 470 does not have a shadowbox configuration and does not define a tortuous flow path from outside the vent assembly 400 to the cavity 412. Unlike the embodiments described above, however, in this example the rupture valve 480, the inner circumferential boundary 463 of the perimeter region 462 of the base portion 460, and the inner circumferential boundary of the retainer portion 476 defines a square shape rather than a hexagon. Other polygonal shapes are also contemplated including triangles, rectangles, pentagons, octagons, and so on. While an adhesive layer is not currently visible, an adhesive can generally be used to couple the edge region 486 of the rupture valve 480 to the base portion 460 around the rupture valve opening 482. The shape of the inner circumferential boundary 487 of the adhesive (or weld area or overmolded area) on the edge region 486 of the rupture valve 480 will generally form a polygon in some embodiments.

Figure 9:
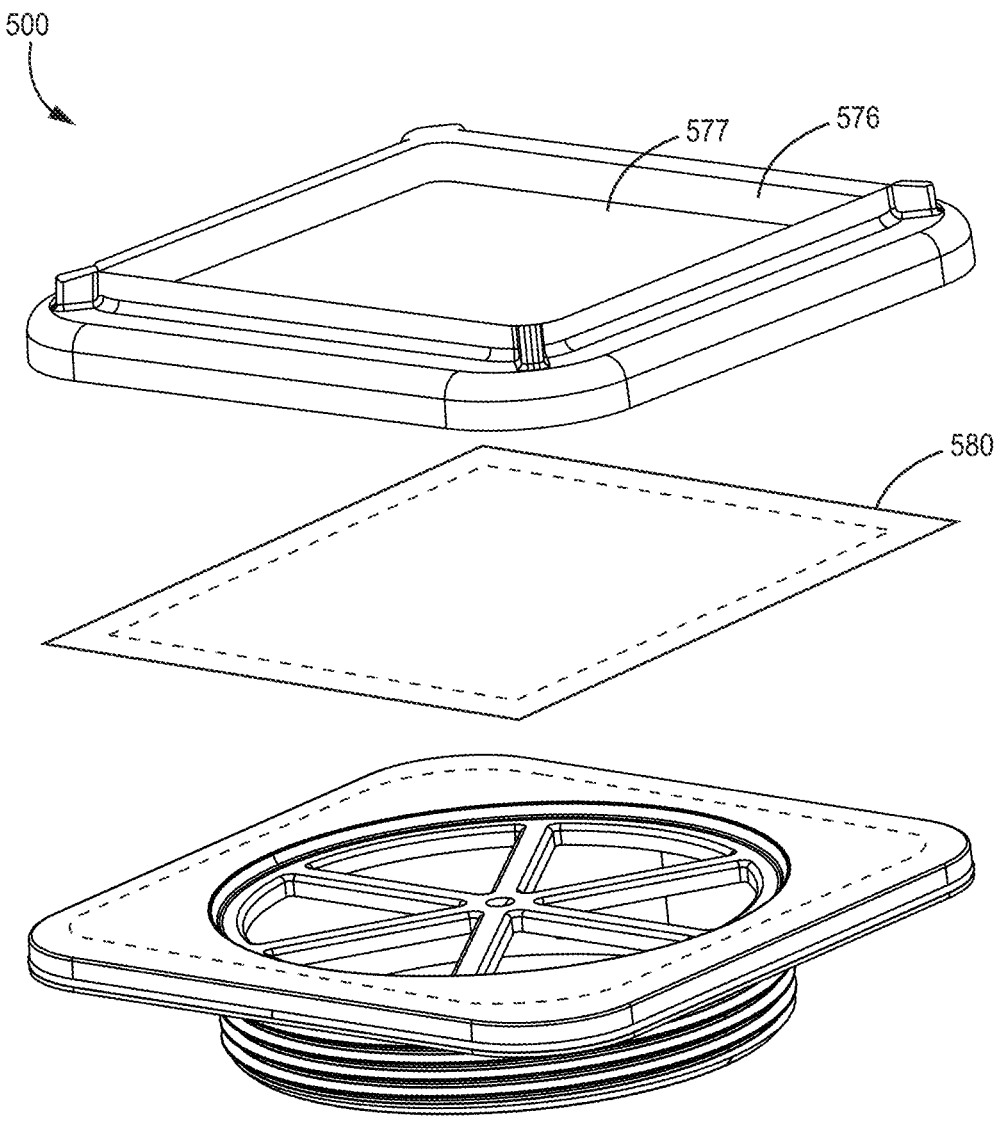
FIG. 9 is a perspective exploded view of yet another example vent assembly consistent with various embodiments.

FIG. 9 is yet another example vent assembly 500 consistent with various embodiments. The vent assembly 500 is consistent with the descriptions above, particularly with respect to the discussion of FIG. 8, which is incorporated by reference into the current discussion except where contradictory to the current description or figure, except that, in the current example, the retainer portion 576 is not integral with a cover. The retainer portion 576 defines a central retainer opening 577 that is open to the outside environment. As such, there are no obstructions between the rupture valve 580 and the environment outside of the vent assembly 500. In should be understood that any of the embodiments disclosed herein can have a retainer portion 576 that is not integral with a cover.

Figure 10:
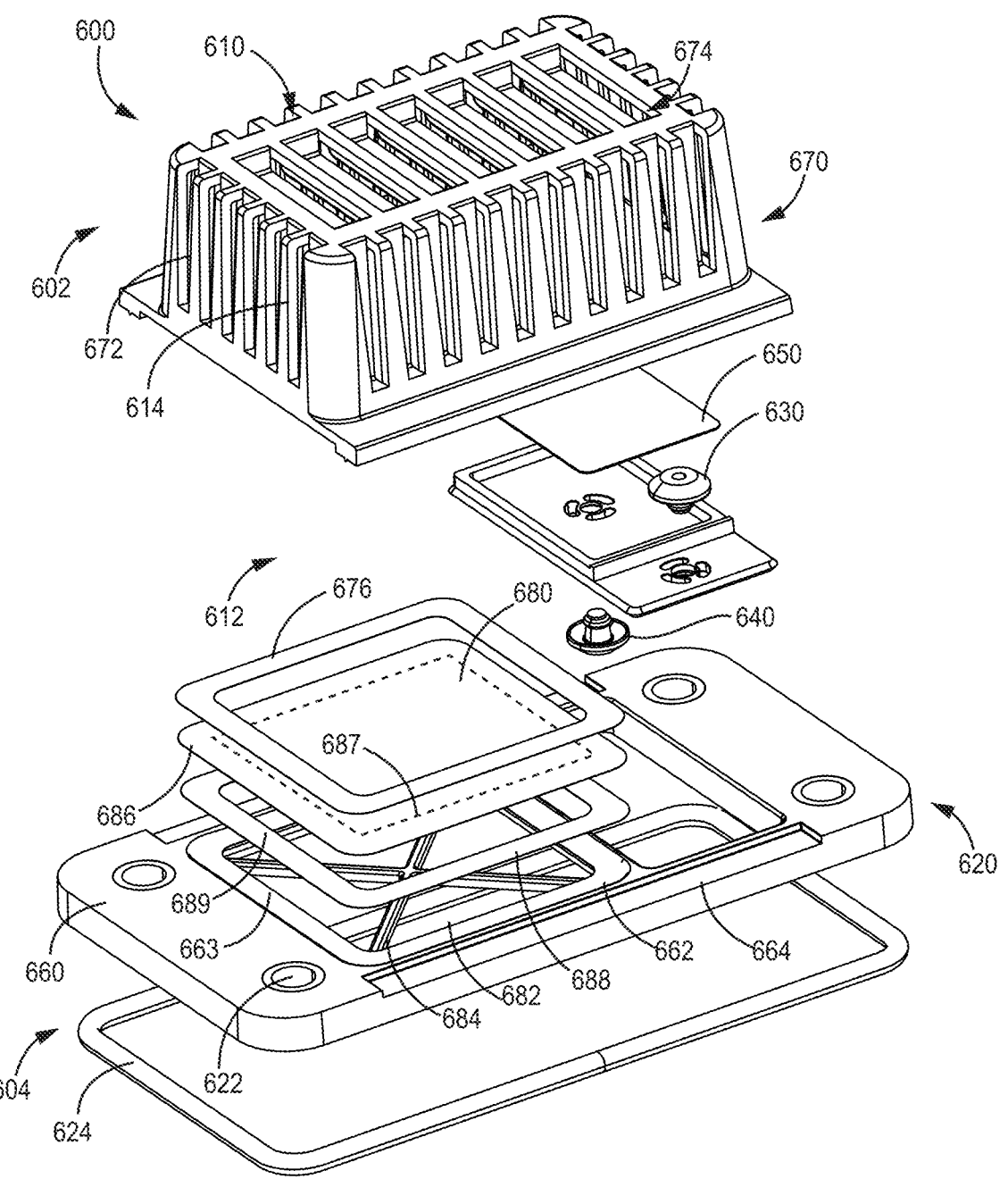
FIG. 10 is a perspective exploded view of yet another example vent assembly consistent with various embodiments.
Figure 11:
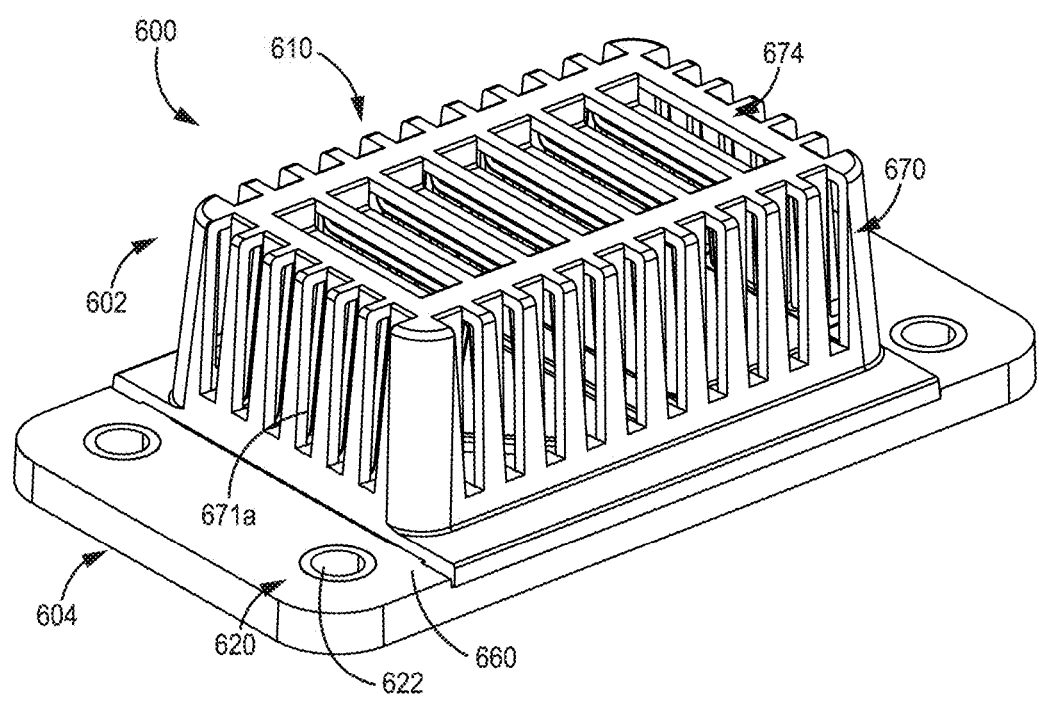
FIG. 11 is a perspective view of a vent assembly consistent with FIG. 10.
Figure 12:
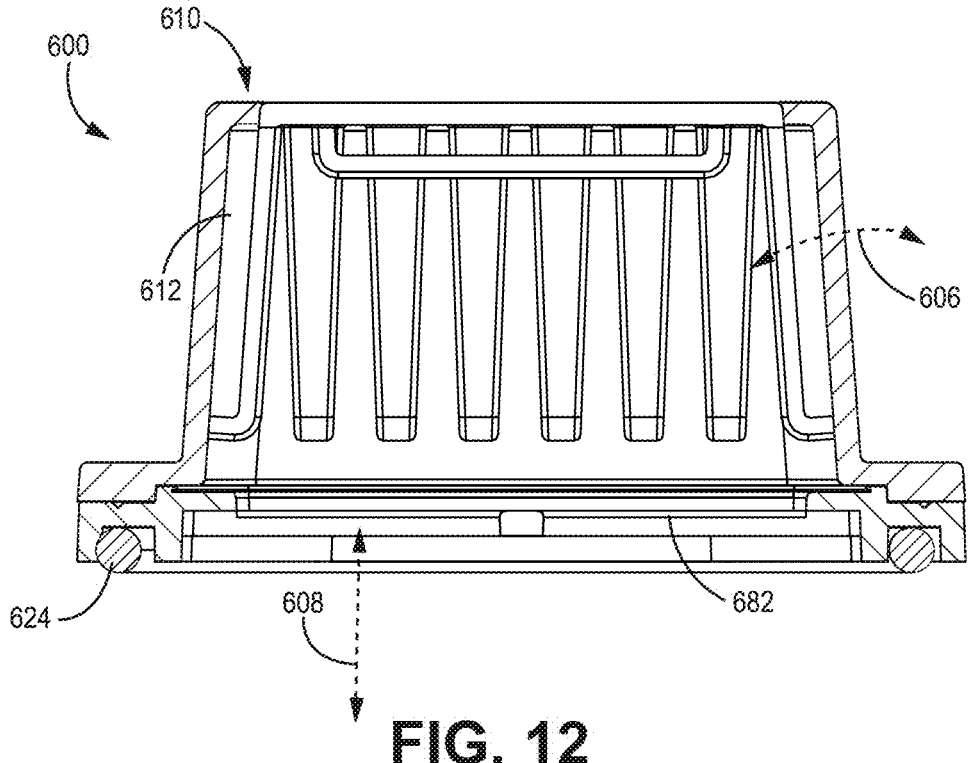
FIG. 12 is a first cross-section of a vent assembly of FIG. 11.
Figure 13:
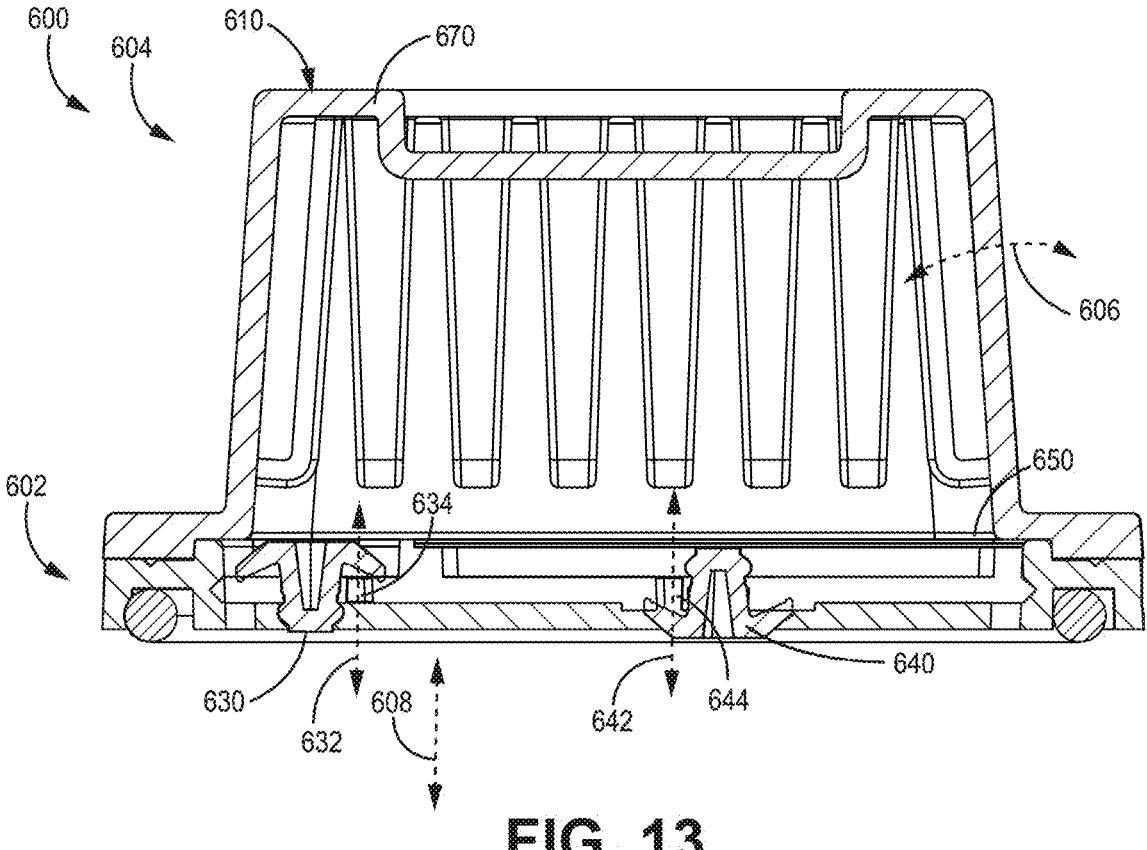
FIG. 13 is a second cross-section of a vent assembly of FIG. 11.

FIG. 10 is an exploded view of yet another exemplary configuration of a vent assembly 600. FIG. 11 shows a perspective view of the exemplary configuration of FIG. 10, FIG. 12 depicts a first cross-section and FIG. 13 depicts a second cross-section of the exemplary vent assembly 600. The components of this example are generally consistent with corresponding components discussed elsewhere herein, which is incorporated by reference into the current discussion, except where contradictory to the current description or figure. The vent assembly 600 has a vent body 610, an outlet relief valve 630, an inlet relief valve 640, a passive airflow vent 650, and a rupture valve 680. The vent assembly 600 has a first axial end 602 and a second axial end 604. The vent body 610 has a coupling structure 620 towards the second axial end 604.

The vent assembly 600 is generally configured to selectively obstruct and facilitate airflow between the first axial end 602 and the second axial end 604 of the vent body 610. The coupling structure 620 is generally configured to sealably couple to an enclosure about an enclosure opening. The coupling structure 620 is generally configured to engage the enclosure. In the current example, the coupling structure 620 has a plurality of fastener receptacles 622 that are each configured to receive a fastener that fastens the vent body to the enclosure. Other coupling structures that can be used as described above.

In embodiments consistent with the current example, the vent assembly 600 has a sealing region 624 (see FIG. 12) surrounding the coupling structure 620. The sealing region 624 is configured to create a seal between the vent assembly 600 and the enclosure when the vent assembly 600 is coupled to the enclosure. The sealing region 624 can include an elastomeric material such as an elastomeric seal. The sealing region 624 can also include a circumferential groove that is configured to receive the seal. In some embodiments the sealing region 624 has a seal that is rubber or another gasketing or sealing material.

The outlet relief valve 630 is generally configured to accommodate pressure release from an enclosure to which the vent assembly 600 is coupled. The outlet relief valve 630 is generally configured to accommodate pressure release from the second axial end 604 to the first axial end 602 through the vent body 610. The inlet relief valve 640 is generally configured to accommodate pressure release from the first axial end 602 to the second axial end 604 through the vent body 610. The inlet relief valve 640 is generally configured to accommodate pressure release from an outside environment to the enclosure to which the vent assembly 600 is coupled. The inlet relief valve 640 and the outlet relief valve 630 can generally be consistent with discussions elsewhere herein.

The passive airflow vent 650 is generally configured to prevent the ingress of outside contaminants to the second axial end 604 from the first axial end 602 through the inlet relief valve 640, particularly when the inlet relief valve 640 is unsealed from the vent body 610. The passive airflow vent 650 is arranged in parallel with the outlet relief valve 630 relative to airflow through the vent body 610. The passive airflow vent 650 is arranged in series with the inlet relief valve 640 with respect to airflow through the vent body 610. The passive airflow vent 650 is generally consistent with the discussions of the passive airflow vent elsewhere herein. In various embodiments, the vent assembly 600 lacks a passive airflow vent in series with the outlet relief valve 630.

The vent body 610 is generally configured to define the inlet airflow pathway 642 (in conjunction with inlet relief valve 640) and the outlet airflow pathway 632 (in conjunction with inlet relief valve 640). In various embodiments, the vent body 610 is also configured to form a cover 670 between one or more of the passive airflow vent 650, the inlet relief valve 640, and the outlet relief valve 630 from the external environment. In the current example, the vent body 610 forms a cover 670 between the passive airflow vent 650 and the environment outside of the vent body 610. In particular, the cover 670 surrounds the passive airflow vent 650 laterally outward from the passive airflow vent 650 and axially outward towards the first axial end 602. In the current example, the cover 670 has a sidewall 672 that surrounds the passive airflow vent 650. Furthermore, the cover 670 extends laterally across the inlet relief valve 640, the outlet relief valve 630, and the passive airflow vent 650. In particular, the cover 670 has an end face 674 coupled to the sidewall 672 that is spaced from the passive airflow vent 650 in the axial direction. The configurations of the end face 674 have been described above.

In some embodiments, such as the one depicted, the cover 670 has a shadowbox configuration, which has been discussed in detail above. As such, the cover 670 defines a tortuous flow path between the cavity 612 and the outside environment. In the current example, vent body 610 defines environmental openings 614 through the cover 670. The environmental openings 614 extend between outside the vent body 610 and the cavity 612.

In the current example the vent body 610 has a base portion 660. The base portion 660 can define the coupling structure 620 that is configured to be coupled to an enclosure. The base portion 660 can define one or more openings corresponding to each of the airflow pathways extending between the first axial end 602 and the second axial end 604 of the vent assembly 600. The base portion 660 can define an inlet valve opening 644 that is selectively obstructed by the inlet relief valve 640. The base portion 660 can define an outlet valve opening 634 that is selectively obstructed by the outlet relief valve 630. The inlet valve opening 644 and the outlet valve opening 634 can be arranged in parallel relative to airflow through the vent assembly 600.

The vent assembly 600 generally defines a first airflow pathway 606 from outside of the vent body 610 to the cavity 612 towards the first axial end 602. The vent assembly 600 defines a second airflow pathway 608 from the outside of the vent body 610 to the vent body 610 towards the second axial end 604. The first airflow pathway 606 and the second airflow pathway 608 are in selective airflow communication through the inlet relief valve 640 (and, therefore the passive airflow vent 650) and the outlet relief valve 630.

In the current example, the vent body 610 has a rim region 652 that surrounds the inlet relief valve 640. The rim region 652 is spaced in the axial direction from the inlet relief valve 640 and the rim region 652 is positioned towards the first axial end 602 relative to the inlet relief valve 640. The passive airflow vent 650 is coupled to the rim region 652 across the inlet relief valve 640.

In the current example, the base portion 660 further defines a rupture valve opening 682. The rupture valve 680 is disposed across the rupture valve opening 682. In particular, the rupture valve 680 is coupled to the base portion 660 around the rupture valve opening 682. In various embodiments, the rupture valve 680 is compressibly disposed between the base portion 660 and a retainer portion 676 around the rupture valve opening 682. In the current example, the rupture valve opening 682 has a perimeter region 662. The rupture valve 680 extends across the rupture valve opening 682 and at least a portion of the perimeter region 662. The retainer portion 676 engages base portion 660 around the rupture valve opening 682. The retainer portion 676 can frictionally engage the base portion 660. In some other embodiment the retainer portion 676 can be adhered to the base portion 660. In some embodiments the retainer portion 676 is overmolded to the base portion 660. An engagement region is defined between the base portion 660 and the retainer portion 676. In various embodiments the engagement region is the perimeter region 662. In various embodiments, the inner circumferential boundary 663 of the engagement region (and, therefore, the inner circumferential boundary 663 of the perimeter region 662) defines a polygonal shape. In this particular example the inner circumferential boundary of the engagement region/ perimeter region 662 defines a square shape.

In various embodiments, engagement between the base portion 660 and the retainer portion 676 results in a compression force on the rupture valve 680. In the current example, the rupture valve 680 has an edge region 686 that is compressibly disposed between the base portion 660 and the retainer portion 676. In some embodiments the edge region 686 of the rupture valve 680 is coextensive with the perimeter region 662. In this example the inner circumferential boundary 687 of the edge region 686 of the rupture valve 680 has a polygonal shape, meaning that the inner circumferential boundary 687 of the edge region 686 around the rupture valve 680 forms a polygon. In this particular example, the rupture valve 680 has a square shape.

In various embodiments, an adhesive 688 is disposed between the rupture valve 680 and the base portion 660 around the rupture valve opening 682 to adhere the rupture valve 680 to the base portion 660 with the adhesive 688. In various embodiments, an adhesive is additionally or alternatively disposed between the rupture valve 680 and the retainer portion 676 to adhere the rupture valve 680 to the retainer portion 676 with the adhesive. The adhesive 688 can be disposed in the edge region 686 of the rupture valve 680. As such, the adhesive 688 can be disposed between the base portion 660 and the retainer portion 676. In example consistent with the current embodiment, the adhesive 688 forms a polygonal shape that is consistent with the shape of the engagement/perimeter region 662 of the base portion 660. In the current example, the adhesive 688 has an inner circumferential boundary 689 that forms a polygonal shape that is consistent with the shape of the inner circumferential boundary 687 of the edge region 686 of the rupture valve 680. Example adhesives 688 are discussed in detail above.

The rupture valve 680 can be constructed of a variety of different materials and combinations of materials and have a variety of different configurations, as discussed in detail above. In various embodiments the rupture valve 680 is non-breathable. In various embodiments the rupture valve 680 is liquid impermeable. In various examples, the vent body 610 has a support brace 684 extending across the rupture valve opening 682, where the support brace 684 is configured to provide structural support to the rupture valve 680. In various embodiments, the support brace 684 abuts the rupture valve 680 across at least a portion of the rupture valve opening 682.

The cover 670 is coupled to a perimeter region 664 of the base portion 660. In this example configuration the retainer portion 676 is not necessarily integral to the cover 670. In particular, the retainer portion 676 can be independent from the cover 670. In some other embodiments, the retainer portion 676 can be coupled to or integral to the cover 670 such that coupling the cover 670 to the base portion 660 results in engaging of the perimeter region 662 of the rupture valve opening 682. In some other embodiments, the retainer portion 676 is configured to be positioned to abut the perimeter region 662 and coupling the cover 670 to the base portion 660 results in compressible engagement of the rupture valve 680 by the retainer portion 676.

Referring particularly to FIGS. 12 and 13 The vent assembly 600 defines a first airflow pathway 606 between outside of the vent body 610 and the cavity 612 towards the first axial end 602, and a second airflow pathway 608 between the outside of the vent body 610 and the vent body 610 towards the second axial end 604. The first airflow pathway 606 and the second airflow pathway 608 are in selective airflow communication through each of the rupture valve 680, the outlet relief valve 630, and the inlet relief valve 640 (combined with the passive airflow vent 650).

Figure 14:
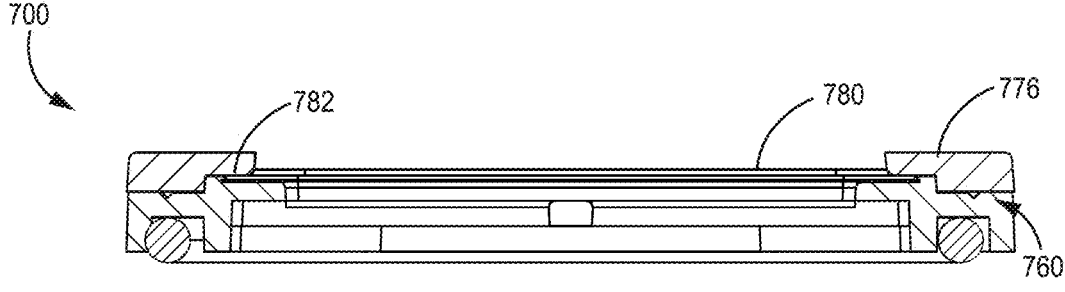
FIG. 14. is a cross-section of an alternate vent assembly.

FIG. 14 is a cross-sectional view of a vent assembly 700 that is generally consistent with the discussion above of vent assembly 700 shown in FIGS. 10-13, which is incorporated by reference into the current discussion except where contradictory to the current description or figure. In this example, however, a cover (such as cover 670) is omitted. Similar to the discussion above, in this example a retainer portion 776 is disposed around the rupture valve 780 to retain an edge region 782 of the rupture valve 780 to the base portion 760. The vent assembly 700 can otherwise be consistent with descriptions above.

EXEMPLARY EMBODIMENTS

Embodiment 1. A vent assembly comprising:
a vent body defining a cavity, a first axial end, a second axial end, wherein the vent body comprises a coupling structure towards the second axial end;
an outlet relief valve selectively sealed to the vent body within the cavity, wherein the outlet relief valve selectively defines an outlet airflow pathway upon a first pressure differential between the first axial end and the second axial end;
an inlet relief valve selectively sealed to the vent body within the cavity, wherein the inlet relief valve selectively defines an inlet airflow pathway upon a second pressure differential between the first axial end and the second axial end, wherein the outlet relief valve and the inlet relief valve are arranged in parallel relative to airflow through the vent body; and
a passive airflow vent disposed in the vent body, wherein the passive airflow vent is arranged in series with the inlet relief valve and the passive airflow vent is arranged in parallel with the outlet relief valve,
wherein the vent body forms a cover between the passive airflow vent and an environment outside of the vent body, wherein the cover surrounds the passive airflow vent laterally outward from the passive airflow vent and axially outward from the passive airflow vent, wherein the cover is positioned towards the first axial end.

Embodiment 2. The vent assembly of any one of embodiments 1 and 3-13, wherein the cover extends laterally across the inlet relief valve, the outlet relief valve, and the passive airflow vent.

Embodiment 3. The vent assembly of any one of embodiments 1-2 and 4-13, wherein the cover comprises a cohesive barrier.

Embodiment 4. The vent assembly of any one of embodiments 1-3 and 5-13, wherein at least a portion of the cover has a shadowbox configuration.

Embodiment 5. The vent assembly of any one of embodiments 1-4 and 6-13, wherein the vent body defines a tortuous path from the outside environment to the passive airflow vent.

Embodiment 6. The vent assembly of any one of embodiments 1-5 and 7-13, wherein the vent assembly lacks a passive airflow vent in series with the outlet relief valve.

Embodiment 7. The vent assembly of any one of embodiments 1-6 and 8-13, wherein the passive airflow vent comprises a breathable membrane that is configured to obstruct liquid water flow therethrough.

Embodiment 8. The vent assembly of any one of embodiments 1-7 and 9-13, where the vent body further defines an environmental opening extending between the cavity and the environment outside of the vent body, wherein the environmental opening is positioned in the axial direction between the second axial end and the passive airflow vent.

Embodiment 9. The vent assembly of any one of embodiments 1-8 and 10-13, wherein the inlet airflow pathway extends from the environmental opening in a first axial direction towards the first axial end of the vent body and then in the opposite axial direction towards the second axial end of the vent body.

Embodiment 10. The vent assembly of any one of embodiments 1-9 and 11-13, wherein the vent body defines:
a first airflow pathway between outside of the vent body and the cavity towards the first axial end, and
a second airflow pathway between the outside of the vent body and the vent body towards the second axial end, wherein the first airflow pathway and the second airflow pathway are in selective airflow communication through the inlet relief valve and the outlet relief valve.

Embodiment 11. The vent assembly of any one of embodiments 1-10 and 12-13, wherein the first pressure differential ranges from −0.25 to −1.1 psi.

Embodiment 12. The vent assembly of any one of embodiments 1-11 and 13, wherein the second pressure differential ranges from 0.25 to 1.1 psi.

Embodiment 13. The vent assembly of any one of embodiments 1-12, further comprising a sealing surface surrounding the coupling structure.

Embodiment 14. A vent assembly comprising:

a vent body comprising a base portion and a retainer portion, wherein the base portion defines a perimeter region and a rupture valve opening, and the retainer portion engages the base portion around the rupture valve opening; and a rupture valve adhered to the vent body across the rupture valve opening, wherein the rupture valve is compressibly disposed between the base portion and the retainer portion around the rupture valve opening.

Embodiment 15. The vent assembly of any one of embodiments 14 and 16-37, wherein the rupture valve is non-breathable.

Embodiment 16. The vent assembly of any one of embodiments 14-15 and 17-37, further comprising an adhesive coupling the rupture valve to the vent body.

Embodiment 17. The vent assembly of any one of embodiments 14-16 and 18-37, wherein the adhesive is disposed between the base portion and the retainer portion.

Embodiment 18. The vent assembly of any one of embodiments 14-17 and 19-37, wherein the adhesive has an inner circumferential boundary that forms a polygonal shape.

Embodiment 19. The vent assembly of any one of embodiments 14-18 and 20-37, wherein the adhesive has an inner circumferential boundary that forms a hexagonal shape.

Embodiment 20. The vent assembly of any one of embodiments 14-19 and 21-37, wherein an inner circumferential boundary of the perimeter region of the base portion defines the polygonal shape.

Embodiment 21. The vent assembly of any one of embodiments 14-20 and 22-37, wherein the polygonal shape of the inner circumferential boundary of the perimeter region of the base portion is hexagonal.

Embodiment 22. The vent assembly of any one of embodiments 14-21 and 23-37, wherein the adhesive comprises silicone.

Embodiment 23. The vent assembly of any one of embodiments 14-22 and 24-37, wherein the vent body is overmolded to the rupture valve in an edge region of the rupture valve.

Embodiment 24. The vent assembly of any one of embodiments 14-23 and 25-37, wherein the edge region has an inner circumferential boundary that defines a polygonal shape.

Embodiment 25. The vent assembly of any one of embodiments 14-24 and 26-37, wherein the rupture valve comprises skived PTFE.

Embodiment 26. The vent assembly of any one of embodiments 14-25 and 27-37, wherein the rupture valve is non-porous.

Embodiment 27. The vent assembly of any one of embodiments 14-26 and 28-37, wherein the rupture valve has a thickness from 0.5 mils to 10 mils.

Embodiment 28. The vent assembly of any one of embodiments 14-27 and 29-37, wherein the vent body further comprises a support brace extending across the rupture valve opening, the support brace abutting the rupture valve.

Embodiment 29. The vent assembly of any one of embodiments 14-28 and 30-37, further comprising a cover coupled to the perimeter region of the base portion, the cover comprising a sidewall extending axially outward from the base portion, and an end face coupled to the sidewall.

Embodiment 30. The vent assembly of any one of embodiments 14-29 and 31-37, wherein the retainer portion is integral to the cover.

Embodiment 31. The vent assembly of any one of embodiments 14-30 and 32-37, wherein the end face is at least 10 mm from the rupture valve in the axial direction.

Embodiment 32. The vent assembly of any one of embodiments 14-31 and 33-37, wherein the end face is no more than 30 mm from the rupture valve in the axial direction.

Embodiment 33. The vent assembly of any one of embodiments 14-32 and 34-37, wherein the axial distance between the end face and the rupture valve is at least 42% of a cross-dimension of an active area of the rupture valve.

Embodiment 34. The vent assembly of any one of embodiments 14-33 and 35-37, wherein the sidewall and the end face define a lattice structure.

Embodiment 35. The vent assembly of any one of embodiments 14-34 and 36-37, wherein the sidewall defines a tortuous flow path from inside the cover to outside the cover.

Embodiment 36. The vent assembly of any one of embodiments 14-35 and 37, wherein at least a portion of the cover has a shadowbox configuration.

Embodiment 37. The vent assembly of any one of embodiments 14-36, wherein the cover defines a total flow area that is greater than a flow area of the rupture valve opening.

Embodiment 38. A vent assembly comprising:

a vent body comprising a base portion, wherein the base portion defines a perimeter region and a rupture valve opening;

a rupture valve disposed across the rupture valve opening, the rupture valve having an edge region having an inner circumferential boundary; wherein the rupture valve is adhered to the vent body in the edge region, wherein the inner circumferential boundary forms a polygonal shape.

Embodiment 39. The vent assembly of any one of embodiments 38 and 40-63, wherein the vent body is overmolded to the rupture valve in the edge region of the rupture valve.

Embodiment 40. The vent assembly of any one of embodiments 38-39 and 41-63, further comprising adhesive disposed between the rupture valve and the base portion, whereby the rupture valve is adhered to the base portion with the adhesive having an inner circumferential boundary.

Embodiment 41. The vent assembly of any one of embodiments 38-40 and 42-63, wherein the inner circumferential boundary of the adhesive is hexagonal.

Embodiment 42. The vent assembly of any one of embodiments 38-41 and 43-63, wherein the rupture valve has an edge region with an inner circumferential boundary having a polygonal shape.

Embodiment 43. The vent assembly of any one of embodiments 38-42 and 44-63, wherein the polygonal shape is hexagonal.

Embodiment 44. The vent assembly of any one of embodiments 38-43 and 45-63, wherein the rupture valve is non-breathable.

Embodiment 45. The vent assembly of any one of embodiments 38-44 and 46-63, further comprising a retainer portion compressibly retaining the rupture valve to the base portion around the rupture valve opening, wherein the retainer portion engages the base portion around the rupture valve opening.

Embodiment 46. The vent assembly of any one of embodiments 38-45 and 47-63, wherein an adhesive is disposed between the base portion and the retainer portion.

Embodiment 47. The vent assembly of any one of embodiments 38-46 and 48-63, wherein an engagement region is defined between the base portion and the retainer portion, and the engagement region has an inner circumferential boundary that defines a polygonal shape.

Embodiment 48. The vent assembly of any one of embodiments 38-47 and 49-63, wherein the inner circumferential boundary of the engagement region is hexagonal.

Embodiment 49. The vent assembly of any one of embodiments 38-48 and 50-63, wherein the adhesive comprises silicone.

Embodiment 50. The vent assembly of any one of embodiments 38-49 and 51-63, wherein the rupture valve comprises skived PTFE.

Embodiment 51. The vent assembly of any one of embodiments 38-50 and 52-63, wherein the rupture valve is non-porous.

Embodiment 52. The vent assembly of any one of embodiments 38-51 and 53-63, wherein the rupture valve has a thickness from 0.5 mils to 10 mils.

Embodiment 53. The vent assembly of any one of embodiments 38-52 and 54-63, wherein the vent body further comprises a support brace extending across the rupture valve opening, the support brace abutting the rupture valve.

Embodiment 54. The vent assembly of any one of embodiments 38-53 and 55-63, further comprising a cover coupled to the perimeter region of the base portion, the cover comprising a sidewall extending axially outward from the base portion, and an end face coupled to the sidewall.

Embodiment 55. The vent assembly of any one of embodiments 38-54 and 56-63, wherein the retainer portion is integral to the cover.

Embodiment 56. The vent assembly of any one of embodiments 38-55 and 57-63, wherein the end face is at least 10 mm from the rupture valve in the axial direction.

Embodiment 57. The vent assembly of any one of embodiments 38-56 and 58-63, wherein the end face is no more than 30 mm from the rupture valve in the axial direction.

Embodiment 58. The vent assembly of any one of embodiments 38-57 and 59-63, wherein the axial distance between the end face and the rupture valve is at least 42% of a cross-dimension of an active area of the rupture valve.

Embodiment 59. The vent assembly of any one of embodiments 38-58 and 60-63, wherein the sidewall and the end face define a lattice structure.

Embodiment 60. The vent assembly of any one of embodiments 38-59 and 61-63, wherein at least a portion of the cover has a shadowbox configuration.

Embodiment 61. The vent assembly of any one of embodiments 38-60 and 62-63, wherein the sidewall defines a tortuous flow path from inside the cover to outside the cover.

Embodiment 62. The vent assembly of any one of embodiments 38-61 and 63, wherein the cover defines a total flow area that is greater than a flow area of the rupture valve opening.

Embodiment 63. The vent assembly of any one of embodiments 38-62, wherein the rupture valve has an edge region that is compressibly disposed between the base portion and the retainer portion, and wherein the adhesive is disposed between the base portion and the retainer portion.

Embodiment 64. A vent assembly comprising:

a vent body comprising a cover, wherein a cavity is defined by the cover, and wherein the cover comprises a sidewall and an end face coupled to the sidewall, wherein the sidewall has a shadowbox configuration; and a rupture valve configured to be positioned in the cavity, wherein the rupture valve is disposed across a rupture valve opening.

Embodiment 65. The vent assembly of any one of embodiments 64 and 66-91, further comprising a base portion having a perimeter region coupled to the cover, wherein the base portion defines the rupture valve opening.

Embodiment 66. The vent assembly of any one of embodiments 64-65 and 67-91, wherein the rupture valve opening is defined by a battery housing, and the cover has a sealing region retainer portion that is configured to couple to the battery housing.

Embodiment 67. The vent assembly of any one of embodiments 64-66 and 68-91, further comprising an adhesive coupling the rupture valve to the vent body.

Embodiment 68. The vent assembly of any one of embodiments 64-67 and 69-91, further comprising a retainer portion coupled to the base portion, wherein the rupture valve is compressibly disposed between the base portion and the retainer portion around the rupture valve opening.

Embodiment 69. The vent assembly of any one of embodiments 64-68 and 70-91, wherein an adhesive is disposed between the base portion and the retainer portion around the rupture valve opening.

Embodiment 70. The vent assembly of any one of embodiments 64-69 and 71-91, wherein the retainer portion is integral to the cover.

Embodiment 71. The vent assembly of any one of embodiments 64-70 and 72-91, wherein the adhesive has an inner circumferential boundary that forms a polygonal shape on the base portion.

Embodiment 72. The vent assembly of any one of embodiments 64-71 and 73-91, wherein the polygonal shape of the inner circumferential boundary is hexagonal.

Embodiment 73. The vent assembly of any one of embodiments 64-72 and 74-91, wherein the rupture valve has an edge region with an inner circumferential boundary defining a polygonal shape.

Embodiment 74. The vent assembly of any one of embodiments 64-73 and 75-91, wherein the polygonal shape of the edge region of the rupture valve is hexagonal.

Embodiment 75. The vent assembly of any one of embodiments 64-74 and 76-91, wherein the rupture valve is non-breathable.

Embodiment 76. The vent assembly of any one of embodiments 64-75 and 77-91, wherein the retainer portion engages the perimeter region of the base portion.

Embodiment 77. The vent assembly of any one of embodiments 64-76 and 78-91, wherein the perimeter region of the base portion has an inner circumferential boundary that defines a polygonal shape.

Embodiment 78. The vent assembly of any one of embodiments 64-77 and 79-91, wherein the polygonal shape of the inner circumferential boundary of the perimeter region of the base portion is hexagonal.

Embodiment 79. The vent assembly of any one of embodiments 64-78 and 80-91, wherein the adhesive comprises silicone.

Embodiment 80. The vent assembly of any one of embodiments 64-79 and 81-91, wherein the vent body is overmolded to the rupture valve in an edge region of the rupture valve.

Embodiment 81. The vent assembly of any one of embodiments 64-80 and 82-91, wherein the edge region has an inner circumferential boundary that defines a polygonal shape.

Embodiment 82. The vent assembly of any one of embodiments 64-81 and 83-91, wherein the rupture valve comprises skived PTFE.

Embodiment 83. The vent assembly of any one of embodiments 64-82 and 84-91, wherein the rupture valve is non-porous.

Embodiment 84. The vent assembly of any one of embodiments 64-83 and 85-91, wherein the rupture valve has a thickness from 0.5 mils to 10 mils.

Embodiment 85. The vent assembly of any one of embodiments 64-84 and 86-91, wherein the vent body further comprises a support brace extending across the rupture valve opening, the support brace abutting the rupture valve.

Embodiment 86. The vent assembly of any one of embodiments 64-85 and 87-91, wherein the end face is at least 10 mm from the rupture valve in the axial direction.

Embodiment 87. The vent assembly of any one of embodiments 64-86 and 88-91, wherein the end face is no more than 30 mm from the rupture valve in the axial direction.

Embodiment 88. The vent assembly of any one of embodiments 64-87 and 89-91, wherein the axial distance between the end face and the rupture valve is at least 42% of a cross-dimension of an active area of the rupture valve.

Embodiment 89. The vent assembly of any one of embodiments 64-88 and 90-91, wherein the sidewall and the end face define a lattice structure.

Embodiment 90. The vent assembly of any one of embodiments 64-89 and 91, wherein the sidewall defines a tortuous flow path from inside the cover to outside the cover.

Embodiment 91. The vent assembly of any one of embodiments 64-90, wherein the cover defines a total flow area that is greater than a flow area of the rupture valve opening.

Embodiment 92. A vent assembly comprising:
a vent body defining a first axial end, and a second axial end, wherein the vent body comprises a base portion and a coupling structure towards the second axial end;
an outlet relief valve selectively sealed to the vent body, wherein the outlet relief valve selectively defines an outlet airflow pathway upon a first pressure differential between the first axial end and the second axial end;
an inlet relief valve selectively sealed to the vent body, wherein the inlet relief valve selectively defines an inlet airflow pathway upon a second pressure differential between the first axial end and the second axial end, wherein the outlet relief valve and the inlet relief valve are arranged in parallel relative to airflow through the vent body;
a passive airflow vent disposed in the vent body, wherein the passive airflow vent is arranged in series with the inlet relief valve and the passive airflow vent is arranged in parallel with the outlet relief valve; and
a non-breathable rupture valve disposed across a rupture valve opening defined by the vent body, wherein the non-breathable rupture valve is arranged in parallel with the inlet relief valve and the outlet relief valve.

Embodiment 93. The vent assembly of any one of embodiments 92 and 94-130, wherein the vent body is overmolded to the rupture valve in an edge region of the rupture valve.

Embodiment 94. The vent assembly of any one of embodiments 92-93 and 95-130, wherein the edge region has an inner circumferential boundary that defines a polygonal shape.

Embodiment 95. The vent assembly of any one of embodiments 92-94 and 96-130, further comprising adhesive coupling the rupture valve to the vent body around the rupture valve opening.

Embodiment 96. The vent assembly of any one of embodiments 92-95 and 97-130, wherein the adhesive has an inner circumferential boundary that forms a polygonal shape on the base portion.

Embodiment 97. The vent assembly of any one of embodiments 92-96 and 98-130, wherein the inner circumferential boundary of the adhesive has a hexagonal shape.

Embodiment 98. The vent assembly of any one of embodiments 92-97 and 99-130, wherein the adhesive comprises silicone.

Embodiment 99. The vent assembly of any one of embodiments 92-98 and 100-130, further comprising a retainer portion engaging the base portion, wherein the rupture valve is compressibly disposed between the retainer portion and the base portion around the rupture valve opening.

Embodiment 100. The vent assembly of any one of embodiments 92-99 and 101-130, wherein the adhesive is disposed between the base portion and the retainer portion.

Embodiment 101. The vent assembly of any one of embodiments 92-100 and 102-130, wherein the retainer portion engages a perimeter region of the base portion.

Embodiment 102. The vent assembly of any one of embodiments 92-101 and 103-130, wherein the perimeter region of the base portion has an inner circumferential boundary that defines a polygonal shape.

Embodiment 103. The vent assembly of any one of embodiments 92-102 and 104-130, wherein the inner circumferential boundary of the perimeter region of the base portion is hexagonal.

Embodiment 104. The vent assembly of any one of embodiments 92-103 and 105-130, wherein the vent body defines a cavity, and the vent body forms a cover between the cavity and an environment outside of the vent body, wherein the cover surrounds the cavity laterally outward from the cavity and axially outward from the cavity, wherein the cover is positioned towards the first axial end.

Embodiment 105. The vent assembly of any one of embodiments 92-104 and 106-130, wherein the cover defines a total flow area that is greater than a flow area of the rupture valve opening.

Embodiment 106. The vent assembly of any one of embodiments 92-105 and 107-130, further comprising a cover coupled to a perimeter region of the base portion, wherein a cavity is defined by the base portion and the cover.

Embodiment 107. The vent assembly of any one of embodiments 92-106 and 108-130, wherein the cover comprises a sidewall and an end face coupled to the sidewall, wherein the sidewall has a shadowbox configuration.

Embodiment 108. The vent assembly of any one of embodiments 92-107 and 109-130, wherein the end face is at least 10 mm from the rupture valve in the axial direction.

Embodiment 109. The vent assembly of any one of embodiments 92-108 and 110-130, wherein the end face is no more than 30 mm from the rupture valve in the axial direction.

Embodiment 110. The vent assembly of any one of embodiments 92-109 and 111-130, wherein the axial distance between the end face and the rupture valve is at least 42% of a cross-dimension of an active area of the rupture valve.

Embodiment 111. The vent assembly of any one of embodiments 92-110 and 112-130, wherein the sidewall and the end face define a lattice structure.

Embodiment 112. The vent assembly of any one of embodiments 92-111 and 113-130, wherein the sidewall defines a tortuous flow path from inside the cover to outside the cover.

Embodiment 113. The vent assembly of any one of embodiments 92-112 and 114-130, wherein the retainer portion is integral to the cover.

Embodiment 114. The vent assembly of any one of embodiments 92-113 and 115-130, wherein the rupture valve has an edge region having an inner circumferential boundary that has a polygonal shape.

Embodiment 115. The vent assembly of any one of embodiments 92-114 and 116-130, wherein the polygonal shape of the inner circumferential boundary of the edge region of the rupture valve is hexagonal.

Embodiment 116. The vent assembly of any one of embodiments 92-115 and 117-130, wherein the rupture valve comprises skived PTFE.

Embodiment 117. The vent assembly of any one of embodiments 92-116 and 118-130, wherein the cover extends laterally across the inlet relief valve, the outlet relief valve, the rupture valve, and the passive airflow vent.

Embodiment 118. The vent assembly of any one of embodiments 92-117 and 119-130, wherein the cover comprises a cohesive barrier.

Embodiment 119. The vent assembly of any one of embodiments 92-118 and 120-130, wherein at least a portion of the cover has a shadowbox configuration.

Embodiment 120. The vent assembly of any one of embodiments 92-119 and 121-130, wherein the vent body defines a tortuous flow path from the outside environment to the passive airflow vent.

Embodiment 121. The vent assembly of any one of embodiments 92-120 and 122-130, wherein the vent assembly lacks a passive airflow vent in series with the outlet relief valve.

Embodiment 122. The vent assembly of any one of embodiments 92-121 and 123-130, wherein the passive airflow vent comprises a breathable membrane that is configured to obstruct liquid water flow therethrough.

Embodiment 123. The vent assembly of any one of embodiments 92-122 and 124-130, where the vent body further defines an environmental opening extending between the cavity and the environment outside of the vent body, wherein the environmental opening is positioned in the axial direction between the second axial end and the passive airflow vent.

Embodiment 124. The vent assembly of any one of embodiments 92-123 and 125-130, wherein the inlet airflow pathway extends from the environmental opening in a first axial direction towards the first axial end of the vent body and then in the opposite axial direction towards the second axial end of the vent body.

Embodiment 125. The vent assembly of any one of embodiments 92-124 and 126-130, wherein the vent body defines:

a first airflow pathway between outside of the vent body and the cavity towards the first axial end, and a second airflow pathway between the outside of the vent body and the vent body towards the second axial end, wherein the first airflow pathway and the second airflow pathway are in selective airflow communication through the inlet relief valve, the outlet relief valve, and the rupture valve.

Embodiment 126. The vent assembly of any one of embodiments 92-125 and 127-130, wherein the first pressure differential ranges from −0.25 to −1.1 psi.

Embodiment 127. The vent assembly of any one of embodiments 92-126 and 128-130, wherein the second pressure differential ranges from 0.25 to 1.1 psi.

Embodiment 128. The vent assembly of any one of embodiments 92-127 and 129-130, further comprising a sealing surface surrounding the coupling structure.

Embodiment 129. The vent assembly of any one of embodiments 92-128 and 130, wherein the rupture valve has a thickness from 0.5 mils to 10 mils.

Embodiment 130. The vent assembly of any one of embodiments 92-129, wherein the vent body further comprises a support brace extending across the rupture valve opening, the support brace abutting the rupture valve.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A vent assembly comprising:

a vent body defining a cavity, a first axial end, a second axial end, wherein the vent body comprises a coupling structure towards the second axial end;

an outlet relief valve selectively sealed to the vent body within the cavity, wherein the outlet relief valve selectively defines an outlet airflow pathway upon a first pressure differential between the first axial end and the second axial end;

an inlet relief valve selectively sealed to the vent body within the cavity, wherein the inlet relief valve selectively defines an inlet airflow pathway upon a second pressure differential between the first axial end and the second axial end, wherein the outlet relief valve and the inlet relief valve are arranged in parallel relative to airflow through the vent body; and a passive airflow vent disposed in the vent body, wherein the passive airflow vent is arranged in series with the inlet relief valve and the passive airflow vent is arranged in parallel with the outlet relief valve, wherein the vent assembly lacks a passive airflow vent in series with the outlet relief valve, wherein the vent body forms a cover between the passive airflow vent and an environment outside of the vent body, wherein the cover surrounds the passive airflow vent laterally outward from the passive airflow vent and axially outward from the passive airflow vent, wherein the cover is positioned towards the first axial end.

2. The vent assembly of claim 1, wherein the cover extends laterally across the inlet relief valve, the outlet relief valve, and the passive airflow vent.

3. The vent assembly of claim 1, wherein at least a portion of the cover has a shadowbox configuration.

4. The vent assembly of claim 1, where the vent body further defines an environmental opening extending between the cavity and the environment outside of the vent body, wherein the environmental opening is positioned in the axial direction between the second axial end and the passive airflow vent, and wherein the inlet airflow pathway extends from the environmental opening in a first axial direction towards the first axial end of the vent body and then in the opposite axial direction towards the second axial end of the vent body.

5. A vent assembly comprising:

a vent body defining a cavity, a first axial end, and a second axial end, wherein the vent body comprises a base portion and a coupling structure towards the second axial end;

an outlet relief valve selectively sealed to the vent body within the cavity, wherein the outlet relief valve selectively defines an outlet airflow pathway upon a first pressure differential between the first axial end and the second axial end;

an inlet relief valve selectively sealed to the vent body within the cavity, wherein the inlet relief valve selectively defines an inlet airflow pathway upon a second pressure differential between the first axial end and the second axial end, wherein the outlet relief valve and the inlet relief valve are arranged in parallel relative to airflow through the vent body;

a passive airflow vent disposed in the vent body, wherein the passive airflow vent is arranged in series with the inlet relief valve and the passive airflow vent is arranged in parallel with the outlet relief valve, wherein the vent assembly lacks a passive airflow vent in series with the outlet relief valve, wherein the vent body forms a cover between the passive airflow vent and an environment outside of the vent body, wherein the cover surrounds the passive airflow vent laterally outward from the passive airflow vent and axially outward from the passive airflow vent, wherein the cover is positioned towards the first axial end; and a non-breathable rupture valve disposed across a rupture valve opening defined by the vent body, wherein the non-breathable rupture valve is arranged in parallel with the inlet relief valve and the outlet relief valve.

6. The vent assembly of claim 5, further comprising a retainer portion engaging the base portion, wherein the rupture valve is compressibly disposed between the retainer portion and the base portion around the rupture valve opening.

7. The vent assembly of claim 6, wherein the retainer portion engages a perimeter region of the base portion.

8. The vent assembly of claim 7, wherein the perimeter region of the base portion has an inner circumferential boundary that defines a polygonal shape.

* * * * *